(12) United States Patent
Zheng et al.

(10) Patent No.: US 11,833,770 B2
(45) Date of Patent: Dec. 5, 2023

(54) METHOD FOR PRODUCING EMBEDDED OR HYBRID HYDROGEL CONTACT LENSES

(71) Applicant: Alcon Inc., Fribourg (CH)

(72) Inventors: Yang Zheng, Alpharetta, GA (US); Junhao Ge, Redwood City, CA (US); Steve Yun Zhang, Sugar Hill, GA (US)

(73) Assignee: Alcon Inc., Fribourg (CH)

( * ) Notice: Subject to any disclaimer, the term of this patent is extended or adjusted under 35 U.S.C. 154(b) by 328 days.

(21) Appl. No.: 17/205,148

(22) Filed: Mar. 18, 2021

(65) Prior Publication Data

US 2021/0291469 A1  Sep. 23, 2021

Related U.S. Application Data

(60) Provisional application No. 62/991,750, filed on Mar. 19, 2020.

(51) Int. Cl.
| | | |
|---|---|---|
| B29D 11/00 | (2006.01) | |
| G02B 1/04 | (2006.01) | |
| C08J 3/075 | (2006.01) | |
| C08J 3/24 | (2006.01) | |
| C08L 83/04 | (2006.01) | |

(52) U.S. Cl.
CPC ......... B29D 11/00038 (2013.01); C08J 3/075 (2013.01); C08J 3/24 (2013.01); C08L 83/04 (2013.01); G02B 1/043 (2013.01); *C08L 2203/02* (2013.01)

(58) Field of Classification Search
CPC ....... B29D 11/00038; C08J 3/075; C08J 3/24; C08L 83/04; G02B 1/043
See application file for complete search history.

(56) References Cited

U.S. PATENT DOCUMENTS

| 4,136,250 A | 1/1979 | Mueller |
| 4,153,641 A | 5/1979 | Deichert |
| (Continued) | | |

FOREIGN PATENT DOCUMENTS

| CN | 103890044 A | 6/2014 |
| CN | 108367517 A | 8/2018 |
| (Continued) | | |

OTHER PUBLICATIONS

Kyle C. Heideman and John E. Greivenkamp, "Low-coherence interferometer for contact lens surface metrology", Optical Engineering, vol. 55(3), 034106, Mar. 2016, pp. 1-12.

*Primary Examiner* — Mathieu D Vargot
(74) *Attorney, Agent, or Firm* — Jian Zhou

(57) ABSTRACT

The invention is generally related to a method for producing, in a relatively efficient and consistent manner, embedded or hybrid silicone hydrogel contact lenses, and also to unprocessed embedded or hybrid silicone hydrogel contact lenses, according to conventional cast-molding technologies. A method of the invention involve use of a polymeric non-reactive diluent in preparing a polymerizable composition for forming the silicone hydrogel material of the unprocessed embedded or hybrid silicone hydrogel contact lens, which is cast-molded with a lens mold. The unprocessed cast-molded embedded or hybrid silicone hydrogel contact lens has no or a minimal water-swelling degree, so that lens distortion or delamination during the hydration of the unprocessed embedded or hybrid silicone hydrogel contact lens.

30 Claims, 3 Drawing Sheets

(56) References Cited

U.S. PATENT DOCUMENTS

| | | |
|---|---|---|
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,268,132 A | 5/1981 | Neefe |
| 4,276,402 A | 6/1981 | Chromecek et al. |
| 4,327,203 A | 4/1982 | Deichert |
| 4,341,889 A | 7/1982 | Deichert |
| 4,343,927 A | 8/1982 | Chang |
| 4,355,147 A | 10/1982 | Deichert et al. |
| 4,401,371 A | 8/1983 | Neefe |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,954,586 A | 9/1990 | Toyohima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono et al. |
| 5,070,170 A | 12/1991 | Robertson et al. |
| 5,079,319 A | 1/1992 | Mueller |
| 5,098,546 A | 3/1992 | Kawashima et al. |
| 5,156,726 A | 10/1992 | Nakada et al. |
| 5,346,946 A | 9/1994 | Yokoyama et al. |
| 5,358,995 A | 10/1994 | Lai |
| 5,387,632 A | 2/1995 | Lai |
| 5,416,132 A | 5/1995 | Yokoyama et al. |
| 5,449,729 A | 9/1995 | Lai |
| 5,451,617 A | 9/1995 | Lai |
| 5,486,579 A | 1/1996 | Lai |
| 5,760,100 A | 6/1998 | Nicolson et al. |
| 5,843,346 A | 12/1998 | Morrill |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,762,264 B2 | 7/2004 | Kuenzler et al. |
| 6,851,805 B2 | 2/2005 | Blum et al. |
| 6,867,245 B2 | 3/2005 | Iwata et al. |
| 7,214,809 B2 | 5/2007 | Zanini et al. |
| 7,322,694 B2 | 1/2008 | Dahi et al. |
| 7,423,074 B2 | 9/2008 | Lai |
| 7,490,936 B2 | 2/2009 | Blum et al. |
| 7,588,334 B2 | 9/2009 | Matsushita |
| 7,605,190 B2 | 10/2009 | Moszner et al. |
| 7,828,432 B2 | 11/2010 | Meyers et al. |
| 7,883,207 B2 | 2/2011 | Iyer |
| 7,915,323 B2 | 3/2011 | Awasthi et al. |
| 8,154,804 B2 | 4/2012 | McGinn et al. |
| 8,215,770 B2 | 7/2012 | Blum et al. |
| 8,318,144 B2 | 11/2012 | Ketelson et al. |
| 8,348,424 B2 | 1/2013 | Pugh et al. |
| 8,415,405 B2 | 4/2013 | Maggio |
| 8,420,711 B2 | 4/2013 | Awasthi et al. |
| 8,475,529 B2 | 7/2013 | Clarke |
| 8,529,057 B2 | 9/2013 | Qiu |
| 8,614,261 B2 | 12/2013 | Iwata et al. |
| 8,658,748 B2 | 2/2014 | Liu et al. |
| 8,874,182 B2 | 10/2014 | Etzkorn et al. |
| 9,097,840 B2 | 8/2015 | Chang et al. |
| 9,103,965 B2 | 8/2015 | Chang |
| 9,176,332 B1 | 11/2015 | Etzkorn et al. |
| 9,217,813 B2 | 12/2015 | Liu |
| 9,315,669 B2 | 4/2016 | Holland et al. |
| 9,475,827 B2 | 10/2016 | Chang et al. |
| 9,618,773 B2 | 4/2017 | Clarke |
| 10,081,697 B2 | 9/2018 | Huang et al. |
| 10,139,521 B2 | 11/2018 | Tran et al. |
| 10,139,522 B2 | 11/2018 | Marullo et al. |
| 10,203,521 B2 | 2/2019 | Pugh et al. |
| 10,209,534 B2 | 2/2019 | Alli et al. |
| 2004/0141150 A1 | 7/2004 | Roffman et al. |
| 2004/0212779 A1 | 10/2004 | Dahi et al. |
| 2008/0054505 A1 | 3/2008 | Yao et al. |
| 2008/0208335 A1 | 8/2008 | Blum et al. |
| 2009/0091818 A1 | 4/2009 | Haddock et al. |
| 2009/0244477 A1 | 10/2009 | Pugh et al. |
| 2010/0072643 A1 | 3/2010 | Pugh et al. |
| 2010/0076553 A1 | 3/2010 | Pugh et al. |
| 2011/0157544 A1 | 6/2011 | Pugh et al. |
| 2012/0088843 A1 | 4/2012 | Chang et al. |
| 2012/0088844 A1 | 4/2012 | Kuyu |
| 2012/0120365 A1 | 5/2012 | Legerton et al. |
| 2012/0140167 A1 | 6/2012 | Blum |
| 2012/0218509 A1 | 8/2012 | Back et al. |
| 2012/0234453 A1 | 9/2012 | Pugh et al. |
| 2012/0244088 A1 | 9/2012 | Saxena |
| 2012/0245249 A1 | 9/2012 | Saxena |
| 2014/0276481 A1 | 9/2014 | Pugh et al. |
| 2015/0145155 A1 | 5/2015 | Pugh et al. |
| 2017/0165930 A1 | 6/2017 | Morgan et al. |
| 2018/0081197 A1 | 3/2018 | Qiu et al. |
| 2018/0100038 A1 | 4/2018 | Jing et al. |
| 2018/0100053 A1 | 4/2018 | Jing et al. |

FOREIGN PATENT DOCUMENTS

| | | |
|---|---|---|
| CN | 109560216 A | 4/2019 |
| EP | 0632329 A1 | 1/1995 |
| TW | 200815819 A | 4/2008 |

METHOD FOR PRODUCING EMBEDDED OR HYBRID HYDROGEL CONTACT LENSES

This application claims the benefit under 35 USC § 119 (e) of U.S. provisional application No. 62/991,750, filed on 19 Mar. 2020, incorporated by reference in its entirety.

The present invention generally relates to a method for producing embedded or hybrid silicone hydrogel contact lenses. In addition, the present invention provides unprocessed embedded hybrid silicone hydrogel contact lenses.

BACKGROUND

Hydrogel contact lenses are widely used for correcting many different types of vision deficiencies due to their softness for wearing comfort. They are made of a hydrated, crosslinked polymeric material that contains from about 20% to about 75% by weight of water within the lens polymer matrix at equilibrium. Hydrogel contact lenses generally are produced according to the conventional full cast-molding process. Such a conventional manufacturing process comprises at least the following steps: lens molding (i.e., curing a polymerizable composition in lens molds), demolding (i.e., removing lenses from molds), hydrating lenses, packaging and sterilizing the hydrated lenses. During the lens hydration, the hydrogel contact lenses will absorb water and typically can swell significantly in size.

Typically, after opening the disposable molds, each of the cast-molded silicone hydrogel contact lenses adheres to one of the two mold halves of each mold. The adhesion of a molded silicone hydrogel contact lens to a mold half can be quite strong. Removal (or delensing) of molded lenses from mold halves by force may cause damages to the molded lenses (e.g., completely or partial tears). Further, the lenses removed (delensed) from mold halves can adhere to itself (curl) and would be difficult to be handled. Consequently, those mold halves having a lens adhered thereon are subjected to extraction with an organic solvent in an extraction tank and subsequently to hydration in water in a hydration tank. Those hydrated lenses are then removed from those mold halves and further processed. Because mold halves can take up valuable space in an extraction or hydration tank, it would be desirable for molded lenses to be able to be removed directly from the lens-adhering mold halves before extraction and hydration processes, thereby increasing the product efficiency and yield.

In recent years, it has been proposed that various inserts can be incorporated in hydrogel contact lenses for various purposes, e.g., for corneal health, vision correction, diagnosis, etc. See, for example, U.S. Pat. Nos. 4,268,132, 4,401,371, 5,098,546, 5,156,726, 6,851,805, 7,490,936, 7,883,207, 8,154,804, 8,215,770, 8,348,424, 8,874,182, 9,176,332, 9,618,773, 10203521, and 10209534; and U.S. Pat. Appl. Pub. Nos. 20040141150, 20040212779, 2008/0208335, 2009/0091818, 20090244477, 2010/0072643, 2010/0076553, 20110157544, 2012/0120365, 2012/0140167, 2012/0234453, 2014/0276481, and 2015/0145155). Inserts are typically made of a non-hydrogel material that cannot absorb water and is a non-water-swellable material, whereas a hydrogel contact lens is made of a hydrogel material that typically contains from about 20% to about 75% by weight of water and is a water-swellable material. Hybrid hydrogel contact lenses typically consist essential of one central optical zone of a rigid gas permeable (RGP) material and one peripheral zone of a hydrogel material. It is expected that such huge difference in water-swelling degree between insert (or RGP) material and hydrogel lens material can result in lens distortion or delamination during the hydration of the hydrogel contact lenses with inserts embedded therein or with the RGP material is incorporated therein. It would be difficult to produce embedded or hybrid hydrogel contact according to the known cast-molding process.

U.S. patent Ser. No. 10/139,521 describes a method for making silicone elastomer-hydrogel hybrid contact lenses which comprises delamination-resistant bonds formed between the silicone elastomer and the hydrogel material by incorporating an elastomer-swellable monomer in a polymerizable composition for forming the lens hydrogel material. U.S. patent Ser. No. 10/139,522 describes a method for making silicone elastomer-silicone hydrogel hybride contact lenses, the method involving: incorporating an elastomer-swellable monomer in a polymerizable composition for forming the silicone hydrogel material for forming delamination-resistant bonds between the silicone elastomer and the silicone hydrogel material; and varying the amount of crosslinking agents in the polymerizable composition and/or adding a silicone-containing diluent in the polymerizable composition for imparting the silicone hydrogel material a low swell factor. However, the methods of the those two patents requires elastomer-swellable monomer to be incorporated in a polymerizable composition and cannot be applicable to hydrogel contact lenses having inserts which are embedded in the hydrogel contact lenses and made of a non-elastomer material.

Therefore, there is still a need for producing embedded or hybrid silicone hydrogel contact lenses in a relatively efficient and consistent manner and which can be easily implemented in a production environment.

SUMMARY OF THE INVENTION

In some aspects, the invention provides a method for producing embedded silicone hydrogel contact lenses or hybrid silicone hydrogel contact lenses, the method of invention comprising the steps of: (1) obtaining a polymerizable composition for forming a hydrogel material, wherein the polymerizable composition comprising from about 1% to about 25% by weight of at least one polymeric non-reactive diluent (relative to the total weight of the polymerizable composition) and lens-forming polymerizable materials dissolved in or blended with the polymeric diluent, wherein the polymerizable materials comprise one or more silicone-containing polymerizable components, and at least one hydrophilic vinylic monomer, wherein said at least one polymeric non-reactive diluent is a poly($C_2$-$C_4$ alkyleneoxide) polymer; (2) obtaining an insert or a disk, wherein the insert is made of a non-hydrogel material, wherein the disk is made of a rigid gas permeable material; (3) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed; (4) in no particular order, placing the insert or the disk at a specified position in the lens mold and introducing the polymerizable composition in the lens mold, wherein the insert or the disk is immersed in the polymerizable composition in the lens mold; (5) curing the polymerizable composition in the lens mold to form an unprocessed embedded or hybrid silicone hydrogel contact lens; (6) separating the lens mold obtained in step (5) into the male and female mold halves, with the unprocessed embedded or hybrid silicone hydrogel contact lens adhered on a lens-adhered mold half which is one of the male and female mold halves; (7) removing the unprocessed embedded silicone hydrogel contact lens from the lens-adhered mold half before the unprocessed embedded silicone hydrogel contact lens is contact with water or any liquid; and (8) subjecting the unprocessed embedded or hybrid silicone hydrogel contact lens to post-molding processes including a hydration process and one or more other processes selected from the group consisting of extraction, surface treatment, packaging, sterilization, and combinations thereof.

In other aspects, the invention provides an unprocessed embedded silicone hydrogel contact lens or an unprocessed hybrid silicone hydrogel contact lens, which can be produced according to a method of the invention.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1:
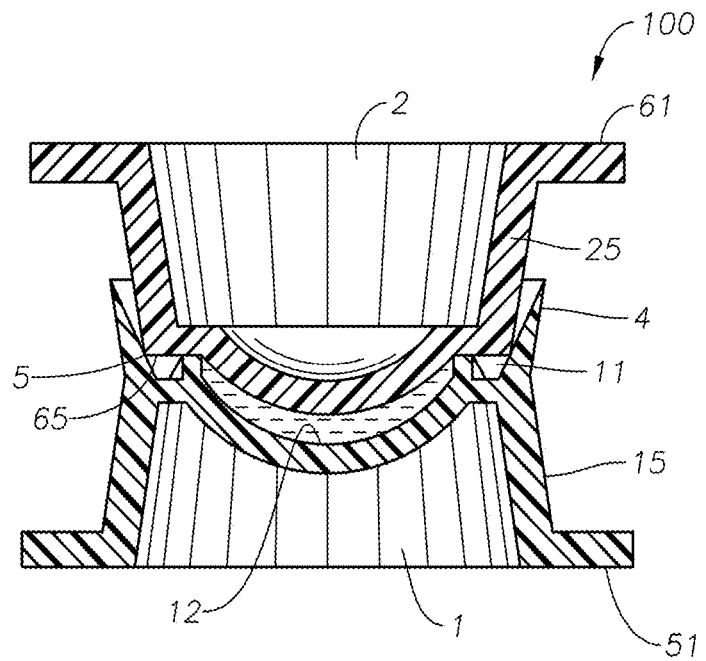
FIG. 1 is a cross-sectional view of a mold according to a preferred embodiment of the invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or an embedded lens.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a cross-linked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

A siloxane, which often also described as a silicone, refers to a molecule having at least one moiety of —Si—O—Si— where each Si atom carries two organic groups as substituents.

As used in this application, the term "non-silicone hydrogel" or "non-silicone hydrogel material" interchangeably refers to a hydrogel that is theoretically free of silicon.

A "SiHy contact lens" refers to a contact lens comprising a SiHy bulk (core) material.

A "hybrid SiHy contact lens" refers to a contact lens consisting essential of two zones: a central optical zone that is made of a rigid gas permeable material; and a peripheral zone that is made of a SiHy material and surrounds the central optical zone like a skirt.

An "embedded SiHy contact lens" refers a SiHy contact lens comprising at least one insert which is made of a non-hydrogel material and embedded within the bulk SiHy material of the embedded SiHy contact lens.

An "insert" refers to any 3-dimensional article which is made of a non-hydrogel material and has a dimension of at least 5 microns but is smaller in dimension sufficient to be embedded in the bulk material of an embedded SiHy contact lens. In accordance with the invention, a non-hydrogel material can be any material which can absorb less than 10% (preferably about 7.5% or less, more preferably about 5.0% or less, even more preferably about 2.5% or less) by weight of water when being fully hydrated. Examples of preferred non-hydrogel materials include without limitation a hard plastics (e.g., crosslinked polymethylmethacrylate), a gas permeable material (e.g., crosslinked material made from fluorosilicone acrylate), a soft plastics, a silicone rubber or elastomer (e.g., a crosslinked silicone polymer), quartz, glass, a silicate material, a ceramic, a metal, a metal oxide, and a carbon material (e.g., graphite, or glassy carbon).

An "unprocessed contact lens" refers to a contact lens which is obtained by cast-molding of a polymerizable composition in a lens mold for and has not been subjected to extraction and/or hydration post-molding processes (i.e., having not been in contact with water or any organic solvent or any liquid after molding). It is understood that an unprocessed contact lens can be an unprocessed hydrogel contact lens, an unprocessed SiHy contact lens, an unprocessed embedded hydrogel contact lens, an unprocessed embedded SiHy contact lens, a hybrid hydrogel contact lens, or a hybrid SiHy contact lens.

The term "water-swelling degree" in reference to an unprocessed contact lens means the percentage of increase in lens diameter when the unprocessed contact lens (i.e., the molded contact lens without being in contact with water or any liquid after molding process) is fully hydrated. The water-swelling degree ("WSD") of any unprocessed contact lens can be expressed by the following equation $$WSD\% = \frac{d_{hydrated} - d_{unprocessed}}{d_{unprocessed}} \times 100\%$$

in which $d_{hydrated}$ represents the diameter of the fully-hydrated contact lens and $d_{unprocessed}$ represents the diameter of the unprocessed contact lens. The diameter of a contact lens is a well known parameter which is labelled for every commercial contact lenses, and typically is the horizontal diameter of a contact lens from edge to edge.

"Hydrophilic," as used herein, describes a material or portion thereof that will more readily associate with water than with lipids.

"Hydrophobic" in reference to an insert material or insert that has an equilibrium water content (i.e., water content in fully hydrated state) of less than 5% (preferably about 4% or less, more preferably about 3% or less, even more preferably about 2% or less).

The term "room temperature" refers to a temperature of about 21° C. to about 27° C.

The term "soluble", in reference to a compound or material in a solvent, means that the compound or material can be dissolved in the solvent to give a solution with a concentration of at least about 0.5% by weight at room temperature.

The term "insoluble", in reference to a compound or material in a solvent, means that the compound or material can be dissolved in the solvent to give a solution with a concentration of less than 0.05% by weight at room temperature.

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=C< group. Exemplary ethylenically unsaturated groups include without limitation (meth)acryloyl

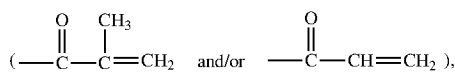

allyl, vinyl, styrenyl, or other C=C containing groups.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

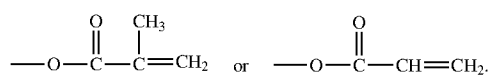

An "(meth)acrylamido monomer" refers to a vinylic monomer having one sole group of

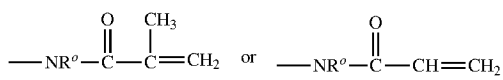

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=CH$_2$) that is directly attached to the nitrogen atom of the amide group.

The term "terminal (meth)acryloyl group" refers to one (meth)acryloyl group at one of the two ends of the main chain (or backbone) of an organic compound as known to a person skilled in the art.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth)acrylamido monomer), which typically yields a homopolymer that is insoluble in water and can absorb less than 10% by weight of water.

A "blending vinylic monomer" refers to a vinylic monomer capable of dissolving both hydrophilic and hydrophobic polymerizable components of a polymerizable composition to form a solution.

A "macromer" or "prepolymer" refers to a compound or polymer comprising ethylenically unsaturated groups and having a number average molecular weight of greater than 700 Daltons.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

A "polysiloxane segment" refers to a polymer chain consisting of at least three consecutively- and directly-linked siloxane units (divalent radical) each independent of one another having a formula of

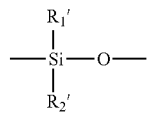

in which $R_1'$ and $R_2'$ are two substituents independently selected from the group consisting of $C_1$-$C_{10}$ alkyl, $C_1$-$C_4$-alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{\gamma 1}$—$OR^\circ$ (in which alk is $C_1$-$D_6$ alkyl diradical, $R^\circ$ is H or $C_1$-$C_4$ alkyl and $\gamma 1$ is an integer from 1 to 10), a $C_2$-$C_{40}$ organic radical having at least one functional group selected from the group consisting of hydroxyl group (—OH), carboxyl group (—COOH), —$NR_3'R_4'$, amino linkages of —$NR_3'$—, amide linkages of —$CONR_3'$—, amide of —$CONR_3'R_4'$, urethane linkages of —OCONH—, and $C_1$-$C_4$ alkoxy group, or a linear hydrophilic polymer chain, in which $R_3'$ and $R_4'$ independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polysiloxane vinylic crosslinker" refers to a compound comprising at least one polysiloxane segment and at least two ethylenically-unsaturated groups.

A "linear polysiloxane vinylic crosslinker" refers to a compound comprising a main chain which includes at least one polysiloxane segment and is terminated with one ethylenically-unsaturated group at each of the two ends of the main chain.

A "chain-extended polysiloxane vinylic crosslinker" refers to a compound comprising at least two ethylenically-unsaturated groups and at least two polysiloxane segments each pair of which is linked by one divalent radical.

A "polycarbosiloxane" refers to a compound containing at least one polycarbosiloxane segment which is a polymer chain consisting of at least three consecutively- and directly-linked siloxane units (divalent radical) each independent of one another having a formula of

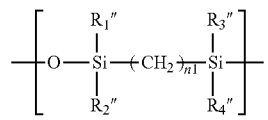

in which n1 is an integer of 2 or 3, $R_1''$, $R_2''$, $R_3''$, and $R_4''$ independent of one another are a $C_1$-$C_6$ alkyl radical (preferably methyl).

A "polycarbosiloxane vinylic monomer" refers to a compound comprising at least one polycarbosiloxane segment and one sole ethylenically-unsaturated group.

A "polycarbosiloxane vinylic crosslinker" refers to a compound comprising at least one polycarbosiloxane segment and at least two ethylenically-unsaturated groups.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater in the range between 400 to 700 nm).

The term "room temperature" refers to a temperature of about 21° C. to about 27° C.

As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

"Post-curing surface treatment", in reference to a SiHy bulk material or a SiHy contact lens, means a surface treatment process that is performed after the SiHy bulk material or the SiHy contact lens is formed by curing (i.e., thermally or actinically polymerizing) a SiHy lens formulation.

A "SiHy lens formulation" refers to a polymerizable composition that comprises all necessary polymerizable components for producing a SiHy contact lens or a SiHy lens bulk material as well known to a person skilled in the art.

A "non-optical surface of a mold half" refers to mold half surface which does not contact the lens forming material during cast molding of a contact lens.

As used in this application, the term "phosphorylcholine" refers to a zwitterionic group of

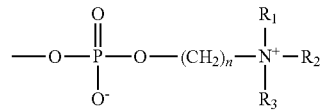

in which n is an integer of 1 to 5 and $R_1$, $R_2$ and $R_3$ independently of each other are $C_1$-$C_8$ alkyl or $C_1$-$C_8$ hydroxyalkyl.

The intrinsic "oxygen permeability", $Dk_i$, of a material is the rate at which oxygen will pass through a material. Oxygen permeability is conventionally expressed in units of barrers, where "barrer" is defined as $[(cm^3 \text{ oxygen})(mm)/(cm^2)(sec)(mm \text{ Hg})] \times 10^{-10}$. The oxygen permeability can be measured according to the procedures described in Example 1.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

The term "modulus" or "elastic modulus" in reference to a contact lens or a material means the tensile modulus or Young's modulus which is a measure of the stiffness of a contact lens or a material. The modulus can be measured according to the procedures described in Example 1.

As used in this application, the term "equilibrium water content" in reference to a contact lens or a polymeric material means the amount (expressed as percent by weight) of water present in the contact lens or the polymeric material when being fully hydrated (equilibrated) in saline solution (ca. 0.79 wt % NaCl) and determined at room temperature (as defined above).

An "aqueous solution" refers to a solution which is a homogeneous mixture consisting of water as solvent and one or more solutes dissolved in water.

The invention is generally related to a method for producing embedded SiHy contact lenses each having at least one insert made of a non-hydrogel material in a relatively efficient and consistent manner. The invention is partly based on the discovery that, by using a certain polymeric non-reactive diluent in preparing a SiHy lens formulation (polymerizable composition) for making SiHy contact lenses, the water-swelling degree of molded embedded SiHy contact lenses during hydration can be controlled, thereby eliminating or minimizing lens distortion and/or delamination. It is believed that such a polymeric non-reactive diluent can remain in molded SiHy material and can hold spaces which can be later replaced by water during hydration. By controlling the amount of the polymeric non-reactive diluent, one can control the water-swelling degree of a molded embedded SiHy contact lens. The invention is also partly based on the discovery that the embedded SiHy contact lenses molded from a SiHy lens formulation with a selected polymeric non-reactive diluent can be dry-delensed (i.e., removed from lens molds without being in contact with water or any liquid) even with a significant amount of (>25 weight unit parts) of the polymeric diluent present in the SiHy lens formulation. It is believed that unlike an organic solvent, a polymeric non-reactive diluent of the invention may not render the molded SiHy material too soft and too fragile, so that the molded SiHy contact lenses can be removed (delensed) directly from the lens molds. This method of the invention can be easily implemented in a production environment for enhancing the production yield.

The present invention provides, in one aspect, a method for producing embedded silicone hydrogel contact lenses each having at least one insert embedded therein, the method of invention comprising the steps of: (1) obtaining a polymerizable composition for forming a silicone hydrogel material, wherein the polymerizable composition comprising from about 1% to about 25% (preferably from about 2.0% to about 20%, more preferably from about 3.0% to about 17.5%, even more preferably from about 4.0% to about 15%) by weight of at least one polymeric non-reactive diluent (relative to the total weight of the polymerizable composition) and polymerizable materials dissolved in (or blended with) the polymeric diluent, wherein the polymerizable materials comprise (a) at least one silicone-containing vinylic monmer and/or at least one silicone-containing vinylic crosslinker and (b) at least one hydrophilic vinylic monomer, wherein said at least one polymeric non-reactive diluent comprises at least one poly($C_2$-$C_4$ alkylene oxide) polymer; (2) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed; (3) obtaining an insert, wherein the insert is made of a non-hydrogel material; (4) in no particular order, placing the insert at a specified position in the lens mold and introducing the polymerizable composition in the lens mold, wherein the insert is immersed in the polymerizable composition in the lens mold; (5) curing the polymerizable composition in the lens mold to form an unprocessed embedded silicone hydrogel contact lens having the insert surrounded by the silicone hydrogel material; (6) separating the lens mold obtained in step (5) into the male and female mold halves, with the unprocessed embedded silicone hydrogel contact lens adhered on a lens-adhered mold half which is one of the male and female mold halves; (7) removing the unprocessed embedded silicone hydrogel contact lens from the lens-adhered mold half; and (8) subjecting the unprocessed embedded silicone hydrogel contact lens to post-molding processes including a hydration process and one or more other processes selected from the group consisting of extraction, surface treatment, packaging, sterilization, and combinations thereof.

The present invention provides, in another aspect, a method for producing hybrid silicone hydrogel contact lenses each consisting essentially of one central optical zone of a rigid gas permeable material and one peripheral zone of a silicone hydrogel material surrounding the central optical zone, the method of invention comprising the steps of: (1) obtaining a polymerizable composition for forming the silicone hydrogel material, wherein the polymerizable composition comprising from about 1% to about 25% (preferably from about 2.0% to about 20%, more preferably from about 3.0% to about 17.5%, even more preferably from about 4.0% to about 15%) by weight of at least one polymeric non-reactive diluent (relative to the total weight of the polymerizable composition) and polymerizable materials dissolved in (or blended with) the polymeric diluent, wherein the polymerizable materials comprise (a) at least one silicone-containing vinylic monomer and/or at least one silicone-containing vinylic crosslinker and (b) at least one hydrophilic vinylic monomer, wherein said at least one polymeric non-reactive diluent comprises a poly($C_2$-$C_4$ alkyleneoxide) polymer; (2) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed; (3) obtaining a disk, wherein the disk is made of the rigid gas permeable material and has a first surface matching a central area of the first molding surface and an opposite second surface matching a central area of the second molding surface; (4) in no particular order, placing the insert or the disk at a specified position in the lens mold and introducing the polymerizable composition in the lens mold, wherein the disk is surrounded by the first and second molding surfaces and the polymerizable composition in the lens mold; (5) curing the polymerizable composition in the lens mold to form an unprocessed hybrid silicone hydrogel contact lens that consists essentially of one central optical zone of the rigid gas permeable material and a peripheral zone of the silicone hydrogel material surrounding the central optical zone; (6) separating the lens mold obtained in step (5) into the male and female mold halves, with the unprocessed hybrid silicone hydrogel contact lens adhered on a lens-adhered mold half which is one of the male and female mold halves; (7) removing the unprocessed hybrid silicone hydrogel contact lens from the lens-adhered mold half; and (8) subjecting the unprocessed hybrid silicone hydrogel contact lens to post-molding processes including a hydration process and one or more other processes selected from the group consisting of extraction, surface treatment, packaging, sterilization, and combinations thereof.

In accordance with the invention, a poly($C_2$-$C_4$ alkyleneoxide) polymer refers to a polymer of $R_1$—O-$(EO)_{m1}$ $(PO)_{n1}(BO)_{p1}$—$R_2$ in which: $R_1$ and $R_2$ independent of each other is hydrogen or a $C_1$-$C_4$ alkyl (preferably hydrogen or methyl); EO is a divalent radical of ethyleneoxide (—$CH_2$—$CH_2$—O—); PO is a divalent radical of propyleneoxide

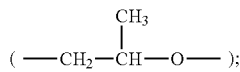

BO is a divalent radical of butyleneoxide

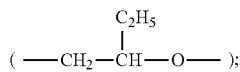

m1 is zero or an integer of from 5 to 65; n1 is zero or an integer of from 5 to 52; p1 is zero or integer of from 5 to 30; wherein if n1 is not zero, p1 is zero; wherein if p1 is not zero, n1 is zero and m1 is not zero; wherein (m1+n1+p1) is a value to provide the poly($C_2$-$C_4$ alkyleneoxide) polymer with a number average molecular weight of from about 300 to about 3000 Daltons (preferably from about 400 to about 2500 Daltons, more preferably from about 400 to about 2000 Daltons, even more preferably from about 400 to about 1500 Daltons).

Examples of preferred poly($C_2$-$C_4$ alkyleneoxide) polymers includes poly(ethyleneoxide) ("PEO"), poly(propyleneoxide) ("PPO"), poly(ethyleneoxide)-poly(propyleneoxide) di-block copolymer ("PEO-PPO"), poly(ethyleneoxide)-poly(propyleneoxide)-poly(ethyleneoxide) tri-block copolymer ("PEO-PPO-PEO"), poly(propyleneoxide)-poly(ethyleneoxide)-poly(propyleneoxide) tri-block copolymer ("PPO-PEO-PPO"), poly(ethyleneoxide)-poly(butyleneoxide) di-block copolymer ("PEO-PBO"), poly(ethyleneoxide)-poly(butyleneoxide)-poly(ethyleneoxide) tri-block copolymer ("PEO-PBO-PEO"), poly(butyleneoxide)-poly(ethyleneoxide)-poly(butyleneoxide) tri-block copolymer ("PBO-PEO-PBO"), and mixtures thereof. Those preferred poly($C_2$-$C_4$ alkyleneoxide) polymers, such as PEO, PPO, PEO-PPO, PEO-PPO-PEO and PPO-PEO-PPO, can be obtained from commercial sources or synthesized according to known methods. PEO-PBO, PEO-PBO-PEO and PBO-PEO-PBO can be synthesized according to procedures described in U.S. Pat. No. 8,318,144.

The amount of the polymeric non-reactive diluent in the polymerizable composition is sufficient for providing the unprocessed embedded SiHy contact lens with a water-swelling degree of from about −7% to about 7% (preferably from about −5% to about 5%, more preferably from about −3% to about 3%, even more preferably from about −1% to about 1%).

In accordance with a preferred embodiment, the polymerizable composition comprises less than 10% (preferably about 7.5% or less, more preferably about 5.0% or less, even more preferably about 2.5% or less) by weight of any non-reactive diluent other than the polymeric non-reactive diluent. In accordance with the invention, organic solvents can be non-reactive diluents other than the polymeric non-reactive diluent. The term "non-reactive diluent" refers to a chemical or material that is a liquid at room temperature and cannot participate in free-radical polymerization reaction.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl- 4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-2-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. More preferred organic solvents include without limitation methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane (various isomers), methylcyclohexane, di methylcyclopentane (various isomers), 2,2,4-trimethylpentane, and mixtures thereof.

In accordance with the invention, any suitable silicone containing polymerizable components can be used in the invention. Silicone-containing polymerizable components are well known to a person skilled in the art, have been reported in the patents and patent applications published by the filing date of this application, and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A. Examples of suitable silicone-containing polymerizable components include without limitation silicone-containing vinylic monomers and silicone-containing vinylic crosslinkers.

Examples of preferred silicone-containing vinylic monomers include without limitation vinylic monomers each having a bis(trialkylsilyloxy)alkylsilyl group or a tris(trialkylsilyloxy)silyl group, polysiloxane vinylic monomers, polycarbosiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Examples of preferred vinylic monomers each having a bis(trialkylsilyloxy)alkylsilyl group or a tris(trialkylsilyloxy)silyl group include without limitation tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)silylpropyl](meth)acrylamide, N-[tris(dimethylethylsiloxy)silylpropyl](meth)acrylamide, N,N-bis[2-hydroxy-3-(3-(bis(trimethylsilyloxy)methylsilyl)propyloxy)propyl]-2-methyl (meth)acrylamide, N,N-bis[2-hydroxy-3-(3-(bis(trimethylsilyloxy)methylsilyl)propyloxy)propyl](meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyloxy)propyloxy)propyl](meth)acrylamide, N-[2-hydroxy-3-(3-(t-butyldimethylsilyl)propyloxy)propyl]-2-methyl (meth)acrylamide, N-[2-hydroxy-3-(3-(t-butyldimethylsilyl) propyloxy)propyl](meth)acrylamide, N,N-bis[2-hydroxy-3-(3-(t-butyldimethylsilyl)propyloxy) propyl]-2-methyl (meth)acrylamide, N-2-(meth)acryloxyethyl-O-(methyl-bis-trimethylsiloxy-3-propyl)silylcarbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, those disclosed in U.S. Pat. Nos. 9,097,840, 9,103,965 and 9,475,827, and mixtures thereof. The above preferred silicone-containing vinylic monomers can be obtained from commercial suppliers or can be prepared according to procedures described in U.S. Pat. Nos. 7,214,809, 8,475,529, 8,658,748, 9,097,840, 9,103,965, and 9,475,827.

Examples of preferred polysiloxane vinylic monomers include without limitation mono-(meth)acryloyl-terminated, monoalkyl-terminated polysiloxanes of formula (I) include without limitation α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth)acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxyethylamino-2-hydroxypropyloxypropyl]-terminated ω-butyl (or ω-methyl) terminated polydimethylsiloxane, α-[3-(meth)acryloxypropylamino-2-hydroxypropyloxypropyl]-terminated ω-butyl (or ω-methyl) terminated polydimethylsiloxane, α-[3-(meth)acryloxy-butylamino-2-hydroxypropyloxypropyl]-terminated ω-butyl (or ω-methyl) terminated polydimethylsiloxane, α-[(meth)acryloxy(polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylaminopropyl]-terminated ω-butyl (or ω-methyl) terminated polydimethylsiloxane, α-[(meth)acryloxy-2-hydroxypropyl-aminopropyl]-terminated ω-butyl (or ω-methyl) terminated polydimethylsiloxane, α-[(meth)acryloxy-2-hydroxypropyloxy-(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated ω-butyl (or ω-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamidopropyloxy-2-hydroxypropyloxypropyl]-terminated ω-butyl (or ω-methyl) terminated polydimethylsiloxane, α-[3-(meth)acrylamidoisopropyloxy-2-hydroxypropyloxypropyl]-terminated ω-butyl (or ω-methyl) terminated polydimethylsiloxane, α-[3-(meth) acrylam idobutyloxy-2-hydroxypropyloxypropyl]-terminated ω-butyl (or ω-methyl) terminated polydimethylsiloxane, α-[3-(meth)acryloylamido-2-hydroxypropyloxypropyl]-terminated ω-butyl (or ω-methyl) polydimethylsiloxane, α-[3-[N-methyl-(meth)acryloylamido]-2-hydroxypropyloxypropyl]-terminated ω-butyl (or ω-methyl) terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, monovinyl carbonate-terminated mono-alkyl-terminated polydimethylsiloxanes, mono-vinyl carbamate-terminated mono-alkyl-terminated polydimethylsiloxane, those disclosed in U.S. Pat. Nos. 9,097,840 and 9,103,965, and mixtures thereof. The above preferred polysiloxanes vinylic monomers can be obtained from commercial suppliers (e.g., Shin-Etsu, Gelest, etc.) or prepared according to procedures described in patents, e.g., U.S. Pat. Nos. 6,867,245, 8,415,405, 8,475,529, 8,614,261, and 9,217,813, or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Examples of preferred polycarbosiloxane vinylic monomers include without limitation those disclosed in U.S. Pat. Nos. 7,915,323 and 8,420,711 and in U.S. Pat. Appl. Pub. Nos. 2012/244088A1 and 2012/245249A1.

Examples of preferred silicone-containing vinylic crosslinkers include without limitation polysiloxane vinylic crosslinkers, polycarbosiloxane vinylic crosslinkers, and combinations thereof.

Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

Examples of preferred di-(meth)acryloyloxy-terminated polysiloxane vinylic crosslinkers includes without limitation the reaction products of glycidyl methacrylate with di-amino-terminated polydimethylsiloxanes; the reaction products of glycidyl methacrylate with di-hydroxyl-terminated polydimethylsiloxanes; the reaction products of isocyantoethyl (meth)acrylate with di-hydroxyl-terminated polydimethylsiloxanes; di-(meth)acryloyloxy-terminated polysiloxane vinylic crosslinkers each having hydrophilized siloxane units each having one methyl substituent and one monovalent $C_4$-$C_{40}$ organic radical substituent having 2 to 6 hydroxyl groups as disclosed in U.S. patent Ser. No. 10/081,697; chain-extended polysiloxabe vinylic crosslinkers disclosed in US201008843A1 and US20120088844A1; chain-extended polysiloxane vinylic crosslinkers described in U.S. Pat. Nos. 5,034,461, 5,416,132, 5,449,729, 5,760,100, 7,423,074, and 8,529,057; chain-extended polysiloxane vinylic crosslinkers described in U.S. Pat. App. Pub. No. 2018-0100053; chain-extended polysiloxane vinylic crosslinkers described in U.S. Pat. App. Pub. No. 2018-0100038; chain-extended polysiloxane vinylic crosslinkers described in U.S. Pat. No. 8,993,651; α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis-[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis-[(meth)acryloxy-2-hydroxypropyloxy-ethoxypropyl]-terminated polydimethylsiloxane, α,ω-bis-[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis-[(meth)acryloxyethylamino-carbonyloxy-ethoxypropyl]-terminated polydimethylsiloxane, α,ω-bis-[(meth)acryloxyethylamino-carbonyloxy-(polyethylenoxy)propyl]-terminated polydimethylsiloxane.

Examples of preferred polycarbosiloxane vinylic crosslinkers include without limitation those disclosed in U.S. Pat. Nos. 7,915,323 and 8,420,711 and in U.S. Pat. Appl. Pub. Nos. 2012/0244088 and 2012/0245249.

In accordance with the invention, any suitable hydrophilic vinylic monomer can be used in the invention. Various hydrophilic vinylic monomers are well known to a person skilled in the art, have been reported in the patents and patent applications published by the filing date of this application, and have been used in producing commercial SiHy contact lenses as recited above.

Examples of preferred hydrophilic vinylic monomers are alkyl (meth)acrylamides (as described below), hydroxyl-containing acrylic monomers (as described below), amino-containing acrylic monomers (as described below), carboxyl-containing acrylic monomers (as described below), N-vinyl amide monomers (as described below), methylene-containing pyrrolidone monomers (i.e., pyrrolidone derivatives each having a methylene group connected to the pyrrolidine ring at 3- or 5-position) (as described below), acrylic monomers having a $C_1$-$C_4$ alkoxyethoxy group (as described below), vinyl ether monomers (as described below), allyl ether monomers (as described below), phosphorylcholine-containing vinylic monomers (as described below), N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, and combinations thereof.

Examples of preferred N-vinyl amide monomers include without limitation N-vinyl pyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing ($=CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly (ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy)propyl-2"-(trimethylammonio)ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio) ethylphosphate, 4-[(meth)acryloylamino]butyl-2'-(trimethylammonio)ethylphosphate, 5-((meth)acryloyloxy) pentyl-2'-(trimethylammonio)ethyl phosphate, 6-((meth) acryloyloxy)hexyl-2"-(trimethylammonio)-ethylphosphate, 2-((meth)acryloyloxy)ethyl-2'-(triethylammonio)ethylphosphate, 2-((meth)acryloyloxy)ethyl-2'-(tripropylammonio) ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy) butyl-2'-(trimethylammonio)ethylphosphate, 2-((meth) acryloyloxy)pentyl-2'-(trimethylammonio)ethylphosphate, 2-((meth)acryloyloxy)hexyl-2"-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2"-(trimethylammonio)ethylphosphate, 2-(allyloxycarbonylamino)ethyl-2'-(trimethylammonio)ethylphosphate, 2-(butenoyloxy)ethyl-2'-(trimethylammonio)ethylphosphate, and combinations thereof.

A SiHy contact lens formulation can also comprise other necessary components known to a person skilled in the art, such as, for example, a non-silicone vinylic crosslinker, a hydrophobic vinylic monomer, a UV-absorbing vinylic monomer, a HEVL-absorbing vinylic monomer, a visibility tinting agent (e.g., reactive dyes, polymerizable dyes, pigments, or mixtures thereof, as well known to a person skilled in the art), antimicrobial agents (e.g., preferably silver nanoparticles), a bioactive agent, leachable lubricants, leachable tear-stabilizing agents, and mixtures thereof, as known to a person skilled in the art.

Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)]di-(meth)acrylate, bis[2-(meth)acryloxyethyl]phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yldihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

In accordance with the invention, any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-di peroxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-050), 2,4-pentanedione peroxide, dicumyl peroxide, peracetic acid, potassium persulfate, sodium persulfate, ammonium persulfate, 2,2'-azobis(4-methoxy-2,4-di methylvaleronitrile) (VAZO 33), 2,2'-Azo-bis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5-methacrylamidophenyl)-5-chlorobenzotriazole, 2-(2'-hydroxy-5-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-

(5-chloro-2H-benzo[d][1,2,3]triazol-2-yl)-6-methoxyphenol (WL-8), 2-{2'-Hydroxy-3'-tert-5-[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9CI) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

The term "UV/HEVL-absorbing vinylic monomer" refers to a vinylic monomer that can absorb UV light and high-energy-violet-light (i.e., light having wavelength between 380 nm and 440 nm. Examples of UV-absorbing vinylic monomers and UV/HEVL-absorbing vinylic monomers are known to a person skilled in the art and are disclosed in the patents and patent application publications, e.g., U.S. Pat. No. 9,315,669, US 2018-0081197 A1, etc.

Where a vinylic monomer capable of absorbing ultraviolet radiation and high energy violet light (HEVL) is used in the invention, a Germanium-based Norrish Type I photoinitiator and a light source including a light in the region of about 400 to about 550 nm are preferably used to initiate a free-radical polymerization. Any Germanium-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190.

The bioactive agent is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The number average molecular weight $M_n$ of the non-crosslinkable hydrophilic polymer is preferably from 5,000 to 1,000,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

A polymerizable composition (SiHy lens formulation) can be prepared by dissolving/blending all of the desirable components in/with the polymeric non-reactive diluent and optionally one or more organic solvents (described above), according to any known techniques.

In a preferred embodiment, a polymerizable composition (a SiHy lens formulation) can comprise at least one blending vinylic monomer as a reactive solvent for aiding the polymeric non-reactive diluent in dissolving all other polymerizable components. Examples of preferred blending vinylic monomers include $C_1$-$C_{10}$ alkyl (meth)acrylate (e.g., methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, etc.), cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof. Preferably, methyl methacrylate is used as a blending vinylic monomer in preparing a polymerizable composition.

In accordance with the invention, the polymerizable composition is suitable for forming a SiHy material that can have a water content of from about 20% to about 70% (preferably from about 20% to about 65%, more preferably from about 25% to about 65%, even more preferably from about 30% to about 60%) by weight when being fully hydrated. The polymerizable composition can comprises: (a) from about 20% to about 79% (preferably from about 20% to about 75%, more preferably from about 25% to about 70%, even more preferably from about 30% to about 65%) by weight of at least one silicone-containing vinylic monomer and/or at least one silicone-containing vinylic crosslinker; (b) 20% to about 79% (preferably from about 20% to about 75%, more preferably from about 25% to about 70%, even more preferably from about 30% to about 65%) by weight of the hydrophilic vinylic monomer; (c) from 0 to about 2.5% (preferably from 0 to about 2.0%, more preferably from 0 to about 1.5%, even more preferably from about 0 to about 1.0%) by weight of the non-silicone vinylic crosslinker; (d) from about 0.05% to about 2.0% (preferably from about 0.1% to about 2.0%, more preferably from about 0.2% to about 1.5%, even more preferably from about 0.3% to about 1.2%) by weight of the free-radical initiator; (e) from 0 to about 15% (preferably from 0 to about 14%, more preferably from about 2% to about 13%, even more preferably from about 4% to about 12%) by weight of the blending vinylic monomer; and (f) from 0 to about 3.0%, preferably about 0.1% to about 2.5%, more preferably about 0.2% to about 2.0%, by weight of the UV-absorbing vinylic monomer and/or the UV/HEVL-absorbing vinylic monomer, relative to the total amount of the polymerizable composition, provided that the sum of the amounts of polymerizable materials (a) to (f) and other not-listed components is 100%. Preferably, the sum of the amounts of polymerizable materials (a) and (b) is at least 70% (preferably at least 75%, more preferably at least 80, even more preferably at least 85%) by weight relative to the total amount of all polymerizable materials in the polymerizable composition.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002. However, for illustrative purposes, the following discussion has been provided as one embodiment of forming a mold.

In general, a mold comprises at least two mold halves (or mold sections), one male half and one female mold half. The male mold half has a first molding (or optical) surface which is in direct contact with a polymerizable composition for cast molding of a contact lens and defines the posterior (concave) surface of a molded contact lens; and the female mold half has a second molding (or optical) surface which is in direct contact with the polymerizable composition and defines the anterior (convex) surface of the molded contact lens. The male and female mold halves are configured to receive each other such that a lens-forming cavity is formed between the first molding surface and the second molding surface.

FIG. 1 schematically illustrates a preferred mold 100 used in the methods of the invention. The mold 100 comprises a female mold half 1 and male mold half 2.

The male mold half 2 comprises a base 61, a substantially cylindrical body 25 which extends upward from base 61, a posterior molding surface defining the posterior (concave) surface of a molded contact lens, and an annular shoulder 65 which surrounds the posterior molding surface. The posterior molding surface protrudes outward from the top of body 25. The annular shoulder 65 shown is flat. It is understood that the annular shoulder 65 can have any suitable surface, such as, e.g., a tilted surface.

The female mold half 1 comprises a base 51, a substantially cylindrical body 15 which extends upward from base 51, an anterior molding surface defining the anterior (convex) surface of a molded contact lens, and a collar 4. The anterior molding surface recesses downward from the top of the body 15. Collar 4 (or up-protruding flange) is preferably integral part of the female mold half 1 and protrudes upward from the top of the body 15. A circumferential groove (or recess) 11 is formed on top of the body 15 between the anterior molding surface and functions as an overflow for any excess unpolymerized lens-forming material.

The term "collar" as used herein refers to a peripheral circular part which protrudes upward from the top of body of one of the two mating mold halves. A collar can be attached to or preferably integral part of that mold half and which can encircle the other mold half to provide a tight seal between the two mold halves. It is understood that the collar can be provided on either of the male and female mold halves.

The female mold half 1 and a male mold half 2 are configured to receive each other such that a contact lens forming cavity 12 is formed between the anterior and posterior molding surfaces. The collar 4 encircles the body 25 of the male mold half 2 to provide a tight seal 5 between the female and male mold halves when the mold is closed. Typically, there is no lens material in the seal.

In operation, mold halves 1 and 2 can be first injection molded from a plastic resin in an injection molding apparatus, as well known to a person skilled in the art. A specific amount of a polymerizable lens-forming material is typically dispensed into the female mold half 1 by means of a dispensing device and then the male mold half 2 is put on and the mold 100 is closed (FIG. 1). As the mold 100 closes, any excess unpolymerized lens-forming material is pressed into an overflow 11 provided on the female mold half 1. It is noted that the insert or RGP disk is not shown in FIG. 1 and FIG. 2. Subsequently, the polymerizable composition in the closed mold 100 is cured thermally in an oven or actinically with UV/visible irradiation.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The mold halves can be formed through various techniques, such as injection molding or lathing. Examples of suitable processes for forming the mold halves are disclosed in U.S. Pat. Nos. 4,444,711; 4,460,534; 5,843,346; and 5,894,002, which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, any insert can be embedded in an embedded SiHy contact lens of the invention, so long as the insert is made of a non-hydrogel material and has a thickness less than any thickness of the embedded SiHy contact lens in the region where the insert is embedded. An insert can be any object have any geometrical shape and can have any desired functions. Examples of preferred inserts include without limitation thin RGP disks for providing rigid center optics for masking astigmatism like a RGP contact lens, multifocal lens inserts, liquid meniscus lens inserts, electro-wetting lens inserts, liquid crystal lens inserts, electro-active lens inserts, electronics inserts, electrode inserts, battery inserts, antennae inserts, circuit inserts, MEM device inserts, sensor inserts, energy receptor inserts, silicone rubber disks having at least one insert (any one of those described above) embedded therein, RGP disks having at least one insert (any one of those described above) embedded therein, etc. The term "RGP" stands for rigid gas permeable. An RGP thin disk is refers to a thin disk that is made of RGP material and optionally can comprises inserts.

In accordance with the invention, any RGP disks can be used in making a hybrid SiHy contact lens of the invention, so long as the RGP disks have the dimension so as to ensure them to become the integral central optical zone of the final hybrid SiHy contact lens product. It is understood that a RGP disk can also have insert embedded therein. Examples of preferred inserts include without limitation multifocal lens inserts, liquid meniscus lens inserts, electro-wetting lens inserts, liquid crystal lens inserts, electro-active lens inserts, electronics inserts, electrode inserts, battery inserts, antennae inserts, circuit inserts, MEM device inserts, sensor inserts, energy receptor inserts, etc.

In accordance with the invention, the insert or the RGP disk can be placed in the mold and the polymerizable composition can be introduced (dispensed) into a cavity formed by a mold according to any known techniques known to a person skilled in the art. In a preferred embodiment, an insert is placed on the molding surface of a female mold half at a specified position; and then a specific amount of a polymerizable composition is dispensed into the female mold half with the insert thereon by means of a dispensing device and then a male mold half is put on and the mold is closed. As the mold closes, any excess unpolymerized lens-forming material is pressed into an overflow provided on the female mold half (or alternatively on the male mold half), and the insert is immersed in the polymerizable composition (or the RGP disk is surrounded by the molding surfaces and the polymerizable composition in the mold).

After the insert is placed in the mold and the polymerizable composition is dispensed into the mold, the closed mold containing the polymerizable composition subsequently is cured (i.e., polymerized) thermally or actinically (but preferably is initiated thermally) to form an unprocessed embedded SiHy contact lens.

The actinic polymerization of the polymerizable composition in the mold can be carried out by irradiating the closed mold with the polymerizable composition therein with an UV or visible light, according to any techniques known to a person skilled in the art.

The thermal polymerization of the polymerizable composition in the mold can be carried out conveniently in an oven at a temperature of from 25 to 120° C. and preferably 40 to 100° C., as well known to a person skilled in the art. The reaction time may vary within wide limits, but is conveniently, for example, from 1 to 24 hours or preferably from 2 to 12 hours. It is advantageous to previously degas the polymerizable composition and to carry out said copolymerization reaction under an inert atmosphere, e.g., under $N_2$ or Ar atmosphere.

In a preferred embodiment, after the polymerizable composition in the molds in the oven is cured to form unprocessed embedded or hybrid SiHy contact lenses, the temperature of the oven is increased to a post-curing temperature of about 105° C. or higher (preferably at least about 110° C., more preferably at least about 115° C., even more preferably at least about 120° C.), and the flow rate of nitrogen gas through the oven is increased to a second flow rate which is at least about 1.5 folds (preferably at least about 2.0 folds, more preferably at least about 3.0 folds, even more preferably at least about 4.0 folds) of the first flow rate.

The post-curing treatment step is carried out by heating the lens mold with the unprocessed embedded or hybrid SiHy contact lens therewithin in the oven at the post-curing temperature under nitrogen gas flow through the oven at the second flow rate for at least about 30 minutes (preferably at least about 60 minutes, more preferably at least about 90 minutes, even more preferably at least about 120 minutes).

After the curing step and optionally the post-curing step, the molds are opened according to any techniques known to a person skilled in the art. For illustrative purposes, the following discussion has been provided as one embodiment of opening a mold (i.e., separating the male mold half from the female mold half with the unprocessed embedded or hybrid SiHy contact lens attached onto one of the male and female mold halves) and delensing (i.e., removing the unprocessed embedded or hybrid SiHy contact lens from the lens-adhered mold half).

Figure 2:
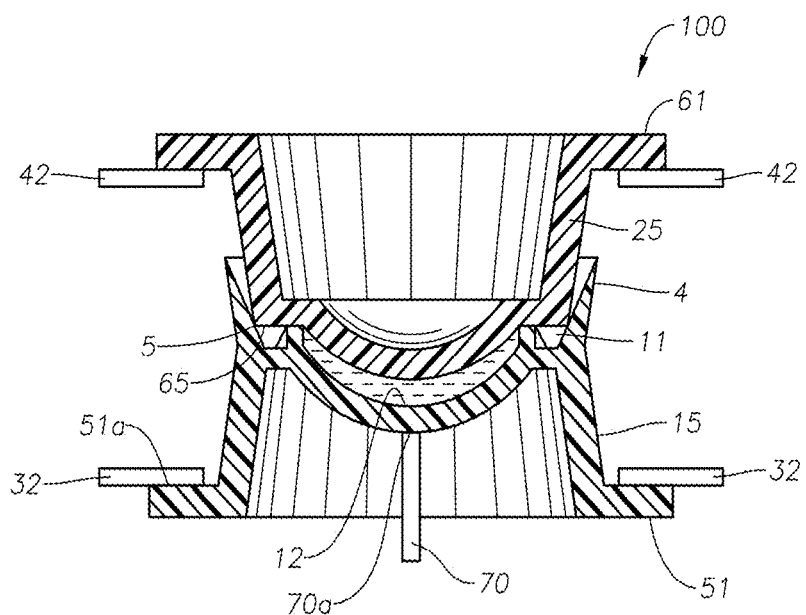
FIG. 2 illustrates schematically a process for separating the male and female mold halves of a lens-forming mold according to the invention and an apparatus for performing a method of the invention.

First, a force is applied to non-optical surface of the female mold at a location about the center area of non-optical molding surface at an angle of less than about 30 degrees, preferably less than about 10 degrees, most preferably less than about 5 degrees (i.e., in a direction substantially normal to center area of non-optical molding surface) relative to the axis of the mold to deform the female mold half which breaks the bonds between the optical molding surface of the female mold half and the molded lens, as shown in FIG. 2. Various ways of applying a force to non-optical surface of the female mold half at a location about the center area of non-optical molding surface along the axis of the mold to deform the female mold half which breaks the bonds between the optical molding surface of the female mold half and the molded lens. It is understood that the mold-opening device can have any configurations known to a person skilled in the art for performing the function of separating two mold halves from each other. For example, referring to FIG. 2, the demolding assembly comprises a pin 70 positionable against the center area of non-optical molding surface of the female mold half. The pin 70 has a flat free end 70a to enable a surface contact between the free end 70a and the center area of non-optical molding surface of the female mold half. It will be appreciated that the scope of the invention is not limited to such a particular flat configuration of the pin end 70a, for example, the pin may have a rounded free end. In the present embodiment, the pin 70 is movable and the female mold half remains stationary by applying a restraining force to the female mold half with a first prying finger 32 for maintaining the female mold half in a fixed position. However, it is possible to arrange the assembly so that the female mold half is movable and the pin 70 remains stationary, or so that both the pin 70 and the female mold half can be moved relative to each other.

In use, during the demolding operation, the free end 70a of the pin 70 applies a longitudinally directed force to the central portion of the non-optical surface of the female mold half. The first prying finger 32 applies a counteractive force against the end face 51a of the flange 51 of the female mold half 1. Consequently, the female mold half is compressed between the free end 70a of the pin 70 and the first finger 32. The compression force deforms the curved part of the female mold half and breaks the adhesive bond between the molding surface of the female mold half 1 and the anterior surface of the molded lens 12.

Then, apply a vertical lifting movement to the male mold half with a second prying finger (while maintaining the restraints on the female mold so as to effectuate gradual separation between the female mold and the male mold.

After breaking the bond between the optical molding surface of the female mold half and the molded lens, the mold is separated, the unprocessed embedded or hybrid SiHy contact lens adheres to the male mold half 2. It is surprising to find out that, according to the present invention, the molded contact lens adhering to the male mold half even though the molding surfaces of the female mold and male mold are not treated before or after dispensing a specific amount of a polymerizable lens-forming material into one of the mold halves to render the molded contact lens preferentially adhered to the female mold or male mold when separating the mold.

According to the present application as mentioned above, the lens typically remains adhered to the male mold section. However, by using similar principle, the compression can be applied to the applying a force to non-optical surface of the male mold half at a location about the center area of non-optical molding surface along the longitudinal axis of the mold to deform the male mold half to compress the female mold half between the pin and the first set of pry fingers so as to break the bonds between the optical molding surface of the male mold half and the molded lens, thereby the molded lens adheres to the female mold half after separating the mold.

In accordance with the invention, the unprocessed embedded or hybrid SiHy contact lens is not too soft and not too fragile and is dry-delensable. The term "dry-delensable" means that the unprocessed embedded or hybrid SiHy contact lens can be directly removed mechanically from the lens-adhered mold half (i.e., by applying a small force onto the unprocessed embedded or hybrid SiHy contact lens without causing the damage, or at most with the help of a cold air gun (which blows the cold air over the unprocessed embedded or hybrid SiHy contact lens and/or the lens-adhered mold half.

After the unprocessed embedded or hybrid SiHy contact lens is delensed, it typically is extracted with an extraction medium as well known to a person skilled in the art. The extraction liquid medium is any solvent capable of dissolving the diluent(s), unpolymerized polymerizable materials, and oligomers in the unprocessed embedded or hybrid SiHy contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The extracted embedded or hybrid SiHy contact lens can then be hydrated according to any method known to a person skilled in the art.

The hydrated embedded or hybrid SiHy contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

In a further aspect, the invention provides an unprocessed embedded silicone hydrogel contact lens, which comprises a silicone hydrogel material, at least one insert, and from about 0.5% to about 24% (preferably from about 1.5% to about 19%, more preferably from about 2.5% to about 17%, even more preferably from about 3.5% to about 14%) by weight of at least one polymeric non-reactive diluent relative to the total weight of the unprocessed embedded silicone hydrogel contact lens, wherein the silicone hydrogel material is a crosslinked material that has a polymer matrix and comprises (a) repeating units of at least one silicone-containing vinylic monomer and/or at least one silicone-containing vinylic crosslinker and (b) repeating units of at least one hydrophilic vinylic monomer, wherein the insert is made of a non-hydrogel material and is surrounded by the silicone hydrogel material, wherein the polymeric non-reactive diluent is distributed within the polymer matrix of the silicone hydrogel material and comprises at least one poly ($C_2$-$C_4$ alkyleneoxide) polymer, wherein the unprocessed embedded silicone hydrogel contact lens is capable of absorbing from about 15% to about 70% (preferably from about 15% to about 65%, more preferably from about 20% to about 65%, even more preferably from about 25% to about 60%) by weight of water when being fully hydrated. Preferably, the unprocessed embedded silicone hydrogel contact lens has a water-swelling degree of from about −7% to about 7% (preferably from about −5% to about 5%, more preferably from about −3% to about 3%, even more preferably from about −1% to about 1%).

In still a further aspect, the invention provides an unprocessed hybrid silicone hydrogel contact lens, consisting essential of two zones: a central optical zone that is made of a rigid gas permeable material; and a peripheral zone that is made of a silicone hydrogel material and surrounds the central optical zone (like a skirt), and comprising from about 0.25% to about 20% (preferably from about 1% to about 16%, more preferably from about 2.0% to about 12.5%, even more preferably from about 3.0% to about 10%) by weight of at least one polymeric non-reactive diluent relative to the total weight of the unprocessed hybrid silicone hydrogel contact lens, wherein the silicone hydrogel material is a crosslinked material that has a polymer matrix and comprises (a) repeating units of at least one silicone-containing vinylic monomer and/or at least one silicone-containing vinylic crosslinker and (b) repeating units of at least one hydrophilic vinylic monomer, wherein the polymeric non-reactive diluent is distributed within the polymer matrix of the silicone hydrogel material and comprises at least one poly($C_2$-$C_4$ alkyleneoxide) polymer, wherein the unprocessed hybrid silicone hydrogel contact lens is capable of absorbing from about 10% to about 60% (preferably from about 15% to about 60%, more preferably from about 20% to about 60%, even more preferably from about 25% to about 55%) by weight of water when being fully hydrated. Preferably, the unprocessed hybrid silicone hydrogel contact lens has a water-swelling degree of from about −7% to about 7% (preferably from about −5% to about 5%, more preferably from about −3% to about 3%, even more preferably from about −1% to about 1%).

All the various embodiments including preferred embodiments of the polymerizable compositions, the silicone-containing vinylic monomers, the silicone-containing vinylci crosslinkers, the hydrophilic vinylic monomers, the non-silicone vinylic crosslinkers, the hydrophobic vinylic monomers, the UV/HEVL-absorbing vinylic monomers, the blending vinylic monomers, the inserts, the RGP disks, the polymeric non-reactive diluents, the water-swelling degrees of unprocessed embedded or hybrid silicone hydrogel contact lenses, and the equilibrium water contents of the embedded or hybrid silicone hydrogel contact lenses can be incorporated in these two aspects of the invention.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for producing embedded or hybrid silicone hydrogel contact lenses, wherein each embedded silicone hydrogel contact lens has at least one insert embedded therein, wherein each hybrid silicone hydrogel contact lens consists essentially of one central optical zone of a rigid gas permeable material and one peripheral zone of a silicone hydrogel material surrounding the central optical zone, comprising the steps of:
   (1) obtaining a polymerizable composition for forming a silicone hydrogel material, wherein the polymerizable composition comprising from about 1% to about 25% (preferably from about 2.0% to about 20%, more preferably from about 3.0% to about 17.5%, even more preferably from about 4.0% to about 15%) by weight of at least one polymeric non-reactive diluent (relative to the total weight of the polymerizable composition) and polymerizable materials dissolved in (or blended with) the polymeric diluent, wherein the polymerizable materials comprise (a) at least one silicone-containing vinylic monmer and/or at least one silicone-containing vinylic crosslinker and (b) at least one hydrophilic vinylic monomer, wherein said at least one polymeric non-reactive diluent comprises a poly($C_2$-$C_4$ alkyleneoxide) polymer;
   (2) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;
   (3) obtaining an insert or a disk, wherein the insert is made of a non-hydrogel material, wherein the disk is made of the rigid gas permeable material and has a first surface matching a central area of the first molding surface and an opposite second surface matching a central area of the second molding surface;
   (4) in no particular order, placing the insert or the disk at a specified position in the lens mold and introducing the polymerizable composition in the lens mold, wherein the insert is immersed in the polymerizable composition in the lens mold, wherein the disk is surrounded by the first and second molding surfaces and the polymerizable composition in the lens mold;
   (5) curing the polymerizable composition in the lens mold to form an unprocessed embedded or hybrid silicone hydrogel contact lens, wherein the unprocessed embedded silicone hydrogel contact lens has the insert surrounded by the silicone hydrogel material, wherein the unprocessed hybrid silicone hydrogel contact lens consists essentially of one central optical zone of the rigid gas permeable material and a peripheral zone of the silicone hydrogel material surrounding the central optical zone;
   (6) separating the lens mold obtained in step (5) into the male and female mold halves, with the unprocessed embedded or hybrid silicone hydrogel contact lens adhered on a lens-adhered mold half which is one of the male and female mold halves;
   (7) removing the unprocessed embedded or hybrid silicone hydrogel contact lens from the lens-adhered mold half; and
   (8) subjecting the unprocessed embedded or hybrid silicone hydrogel contact lens to post-molding processes including a hydration process and one or more other processes selected from the group consisting of extraction, surface treatment, packaging, sterilization, and combinations thereof.
2. The method of embodiment 1, wherein the unprocessed embedded or hybrid silicone hydrogel contact lens is mechanically removed from the lens-adhered mold half.
3. The method of embodiment 2, wherein the step of removing the unprocessed embedded or hybrid silicone hydrogel contact lens from the lens-adhered mold half is aided by blowing cold air over the unprocessed embedded or hybrid silicone hydrogel contact lens and/or the lens-adhered mold half.
4. The method of any one of embodiments 1 to 3, wherein the step of curing the polymerizable composition in the lens mold is carried out actinically by irradiating the polymerizable composition in the mold with a UV light or a visible light.
5. The method of any one of embodiments 1 to 3, wherein the step of curing the polymerizable composition in the lens mold is carried out thermally in an oven at a temperature of from 25 to 120° C. (preferably 40 to 100° C.) for from about 1 to 24 hours.
6. The method of embodiment 5, wherein the step of curing is carried out under an inert atmosphere (e.g., under $N_2$ or Ar atmosphere).
7. The method of any one of embodiments 1 to 6, wherein the amount of the polymeric non-reactive diluent in the polymerizable composition is sufficient for providing the unprocessed embedded silicone hydrogel contact lens with a water-swelling degree of from about −7% to about 7%.
8. The method of any one of embodiments 1 to 6, wherein the amount of the polymeric non-reactive diluent in the polymerizable composition is sufficient for providing the unprocessed embedded or hybrid silicone hydrogel contact lens with a water-swelling degree of from about −5% to about 5%.
9. The method of any one of embodiments 1 to 6, wherein the amount of the polymeric non-reactive diluent in the polymerizable composition is sufficient for providing the unprocessed embedded or hybrid silicone hydrogel contact lens with a water-swelling degree of from about −3% to about 3%.
10. The method of any one of embodiments 1 to 6, wherein the amount of the polymeric non-reactive diluent in the polymerizable composition is sufficient for providing the unprocessed embedded or hybrid silicone hydrogel contact lens with a water-swelling degree of from about −1% to about 1%.
11. The method of any one of embodiments 1 to 10, wherein the polymerizable composition comprises less than 10% by weight of any non-reactive diluent other than the polymeric non-reactive diluent.
12. The method of any one of embodiments 1 to 10, wherein the polymerizable composition comprises about 7.5% or less by weight of any non-reactive diluent other than the polymeric non-reactive diluent.
13. The method of any one of embodiments 1 to 10, wherein the polymerizable composition comprises about 5.0% or less by weight of any non-reactive diluent other than the polymeric non-reactive diluent.
14. The method of any one of embodiments 1 to 10, wherein the polymerizable composition comprises about 2.5% or less by weight of any non-reactive diluent other than the polymeric non-reactive diluent.
15. The method of any one of embodiments 11 to 14, wherein the non-reactive diluent other than the polymeric non-reactive diluent is an organic solvent.
16. The method of embodiment 15, wherein the organic solvent is methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane (various isomers), methylcyclohexane, dimethylcyclopentane (various isomers), 2,2,4-trimethylpentane, or a mixture thereof.
17. The method of any one of embodiments 1 to 16, wherein the polymerizable composition comprises from about 20% to about 79% by weight of said at least one silicone-containing vinylic monomer and/or said at least one silicone-containing vinylic crosslinker (relative to the total weight of the polymerizable composition).
18. The method of any one of embodiments 1 to 16, wherein the polymerizable composition comprises from about 20% to about 75% by weight of said at least one silicone-containing vinylic monomer and/or said at least one silicone-containing vinylic crosslinker (relative to the total weight of the polymerizable composition).
19. The method of any one of embodiments 1 to 16, wherein the polymerizable composition comprises from about 25% to about 70% by weight of said at least one silicone-containing vinylic monomer and/or said at least one silicone-containing vinylic crosslinker (relative to the total weight of the polymerizable composition).
20. The method of any one of embodiments 1 to 16, wherein the polymerizable composition comprises from about 30% to about 65% by weight of said at least one silicone-containing vinylic monomer and/or said at least one silicone-containing vinylic crosslinker (relative to the total weight of the polymerizable composition).
21. The method of any one of embodiments 1 to 16, wherein the polymerizable composition comprises from 20% to about 79% by weight of the hydrophilic vinylic monomer (relative to the total weight of the polymerizable composition).
22. The method of any one of embodiments 1 to 16, wherein the polymerizable composition comprises from 20% to about 75% by weight of the hydrophilic vinylic monomer (relative to the total weight of the polymerizable composition).
23. The method of any one of embodiments 1 to 16, wherein the polymerizable composition comprises from about 25% to about 70%, even more preferably from about 30% to about 65%) by weight of the hydrophilic vinylic monomer (relative to the total weight of the polymerizable composition).
24. The method of any one of embodiments 1 to 16, wherein the polymerizable composition comprises from about 30% to about 65% by weight of the hydrophilic vinylic monomer (relative to the total weight of the polymerizable composition).
25. The method of any one of embodiments 1 to 24, wherein the polymerizable composition comprises from 0 to about 2.5 by weight of at least one non-silicone vinylic crosslinker (relative to the total weight of the polymerizable composition).
26. The method of any one of embodiments 1 to 24, wherein the polymerizable composition comprises from 0 to about 2.0% by weight of at least one non-silicone vinylic crosslinker (relative to the total weight of the polymerizable composition).
27. The method of any one of embodiments 1 to 24, wherein the polymerizable composition comprises from 0 to about 1.5% by weight of at least one non-silicone vinylic crosslinker (relative to the total weight of the polymerizable composition).
28. The method of any one of embodiments 1 to 24, wherein the polymerizable composition comprises from about 0 to about 1.0% by weight of at least one non-silicone vinylic crosslinker (relative to the total weight of the polymerizable composition).
29. The method of any one of embodiments 1 to 28, wherein the polymerizable composition comprises from 0 to about 15% by weight of at least one blending vinylic monomer (relative to the total weight of the polymerizable composition), preferably wherein said at least one blending vinylic monomer is methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof (more preferably wherein said at least one blending vinylic monomer is methyl methacrylate).

30. The method of any one of embodiments 1 to 28, wherein the polymerizable composition comprises from 0 to about 14% by weight of at least one blending vinylic monomer (relative to the total weight of the polymerizable composition), preferably wherein said at least one blending vinylic monomer is methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof (more preferably wherein said at least one blending vinylic monomer is methyl methacrylate).

31. The method of any one of embodiments 1 to 28, wherein the polymerizable composition comprises from about 2% to about 13% by weight of at least one blending vinylic monomer (relative to the total weight of the polymerizable composition), preferably wherein said at least one blending vinylic monomer is methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof (more preferably wherein said at least one blending vinylic monomer is methyl methacrylate).

32. The method of any one of embodiments 1 to 28, wherein the polymerizable composition comprises from about 4% to about 12% by weight of at least one blending vinylic monomer (relative to the total weight of the polymerizable composition), preferably wherein said at least one blending vinylic monomer is methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof (more preferably wherein said at least one blending vinylic monomer is methyl methacrylate).

33. The method of any one of embodiments 1 to 32, wherein the polymerizable composition comprises from 0 to about 3.0% by weight of at least one UV-absorbing vinylic monomer and/or at least one UV/HEVL-absorbing vinylic monomer (relative to the total weight of the polymerizable composition).

34. The method of any one of embodiments 1 to 32, wherein the polymerizable composition comprises from about 0.1% to about 2.5% by weight of at least one UV-absorbing vinylic monomer and/or at least one UV/HEVL-absorbing vinylic monomer (relative to the total weight of the polymerizable composition).

35. The method of any one of embodiments 1 to 32, wherein the polymerizable composition comprises from about 0.2% to about 2.0% by weight of at least one UV-absorbing vinylic monomer and/or at least one UV/HEVL-absorbing vinylic monomer (relative to the total weight of the polymerizable composition).

36. The method of any one of embodiments 1 to 35, wherein the sum of the amounts of polymerizable materials (a) and (b) is at least 70% by weight relative to the total amount of all polymerizable materials in the polymerizable composition.

37. The method of any one of embodiments 1 to 35, wherein the sum of the amounts of polymerizable materials (a) and (b) is at least 75%, more preferably at least 80, even more preferably at least 85%) by weight relative to the total amount of all polymerizable materials in the polymerizable composition.

38. The method of any one of embodiments 1 to 35, wherein the sum of the amounts of polymerizable materials (a) and (b) is at least 80, even more preferably at least 85%) by weight relative to the total amount of all polymerizable materials in the polymerizable composition.

39. The method of any one of embodiments 1 to 35, wherein the sum of the amounts of polymerizable materials (a) and (b) is at least 85% by weight relative to the total amount of all polymerizable materials in the polymerizable composition.

40. An unprocessed embedded silicone hydrogel contact lens, comprising:
   a silicone hydrogel material; at least one insert; and from about 0.5% to about 24% by weight of at least one polymeric non-reactive diluent relative to the total weight of the unprocessed embedded silicone hydrogel contact lens,
   wherein the silicone hydrogel material is a crosslinked material that has a polymer matrix and comprises (a) repeating units of at least one silicone-containing vinylic monomer and/or at least one silicone-containing vinylic crosslinker and (b) repeating units of at least one hydrophilic vinylic monomer,
   wherein the insert is made of a non-hydrogel material and is surrounded by the silicone hydrogel material,
   wherein said at least one polymeric non-reactive diluent is distributed within the polymer matrix of the silicone hydrogel material and comprises a poly($C_2$-$C_4$ alkyleneoxide) polymer,
   wherein the unprocessed embedded silicone hydrogel contact lens is capable of absorbing from about 15% to about 70% by weight of water when being fully hydrated,
   wherein the unprocessed embedded silicone hydrogel contact lens has a water-swelling degree of from about −7% to about 7%.

41. The unprocessed embedded silicone hydrogel contact lens of embodiment 40, comprising from about 1.5% to about 19% by weight of at least one polymeric non-reactive diluent relative to the total weight of the unprocessed embedded silicone hydrogel contact lens.

42. The unprocessed embedded silicone hydrogel contact lens of embodiment 40, comprising from about 2.5% to about 17% by weight of at least one polymeric non-reactive diluent relative to the total weight of the unprocessed embedded silicone hydrogel contact lens.

43. The unprocessed embedded silicone hydrogel contact lens of embodiment 40, comprising from about 3.5% to about 14% by weight of at least one polymeric non-reactive diluent relative to the total weight of the unprocessed embedded silicone hydrogel contact lens.

44. The unprocessed embedded silicone hydrogel contact lens of any one of embodiments 40 to 43, wherein the unprocessed embedded silicone hydrogel contact lens is capable of absorbing from about 15% to about 65% by weight of water when being fully hydrated.

45. The unprocessed embedded silicone hydrogel contact lens of any one of embodiments 40 to 43, wherein the unprocessed embedded silicone hydrogel contact lens is capable of absorbing from about 20% to about 65% by weight of water when being fully hydrated.

46. The unprocessed embedded silicone hydrogel contact lens of any one of embodiments 40 to 43, wherein the unprocessed embedded silicone hydrogel contact lens is capable of absorbing from about 25% to about 60% by weight of water when being fully hydrated.

47. The unprocessed embedded silicone hydrogel contact lens of any one of embodiments 40 to 46, wherein the unprocessed embedded silicone hydrogel contact lens has a water-swelling degree of from about −5% to about 5% preferably.

48. The unprocessed embedded silicone hydrogel contact lens of any one of embodiments 40 to 46, wherein the unprocessed embedded silicone hydrogel contact lens has a water-swelling degree of from about −3% to about 3%.

49. The unprocessed embedded silicone hydrogel contact lens of any one of embodiments 40 to 46, wherein the unprocessed embedded silicone hydrogel contact lens has a water-swelling degree of from about −1% to about 1%.

50. An unprocessed hybrid silicone hydrogel contact lens, consisting essential of two zones:
a central optical zone that is made of a rigid gas permeable material; and a peripheral zone that is made of a silicone hydrogel material and surrounds the central optical zone (like a skirt),
wherein the unprocessed hybrid silicone hydrogel contact lens comprises from about 0.25% to about 20% by weight of at least one polymeric non-reactive diluent relative to the total weight of the unprocessed hybrid silicone hydrogel contact lens,
wherein the silicone hydrogel material is a crosslinked material that has a polymer matrix and comprises (a) repeating units of at least one silicone-containing vinylic monomer and/or at least one silicone-containing vinylic crosslinker and (b) repeating units of at least one hydrophilic vinylic monomer,
wherein said at least one polymeric non-reactive diluent is distributed within the polymer matrix of the silicone hydrogel material and comprises a poly($C_2$-$C_4$ alkyleneoxide) polymer,
wherein the unprocessed hybrid silicone hydrogel contact lens is capable of absorbing from about 10% to about 60% by weight of water when being fully hydrated, wherein the unprocessed hybrid silicone hydrogel contact lens has a water-swelling degree of from about −7% to about 7%.

51. The unprocessed hybrid silicone hydrogel contact lens of embodiment 50, wherein the unprocessed hybrid silicone hydrogel contact lens comprises from about 1% to about 16% by weight of at least one polymeric non-reactive diluent relative to the total weight of the unprocessed hybrid silicone hydrogel contact lens.

52. The unprocessed hybrid silicone hydrogel contact lens of embodiment 50, wherein the unprocessed hybrid silicone hydrogel contact lens comprises from about 2.0% to about 12.5% by weight of at least one polymeric non-reactive diluent relative to the total weight of the unprocessed hybrid silicone hydrogel contact lens.

53. The unprocessed hybrid silicone hydrogel contact lens of embodiment 50, wherein the unprocessed hybrid silicone hydrogel contact lens comprises from about 3.0% to about 10% by weight of at least one polymeric non-reactive diluent relative to the total weight of the unprocessed hybrid silicone hydrogel contact lens.

54. The unprocessed hybrid silicone hydrogel contact lens of any one of embodiments 50 to 53, wherein the unprocessed embedded silicone hydrogel contact lens is capable of absorbing from about 15% to about 60% by weight of water when being fully hydrated.

55. The unprocessed hybrid silicone hydrogel contact lens of any one of embodiments 50 to 53, wherein the unprocessed embedded silicone hydrogel contact lens is capable of absorbing from about 20% to about 60% by weight of water when being fully hydrated.

56. The unprocessed hybrid silicone hydrogel contact lens of any one of embodiments 50 to 53, wherein the unprocessed embedded silicone hydrogel contact lens is capable of absorbing from about 25% to about 55% by weight of water when being fully hydrated.

57. The unprocessed hybrid silicone hydrogel contact lens of any one of embodiments 50 to 56, wherein the unprocessed hybrid silicone hydrogel contact lens has a water-swelling degree of from about −5% to about 5%.

58. The unprocessed hybrid silicone hydrogel contact lens of any one of embodiments 50 to 56, wherein the unprocessed hybrid silicone hydrogel contact lens has a water-swelling degree of from about −3% to about 3%.

59. The unprocessed hybrid silicone hydrogel contact lens of any one of embodiments 50 to 56, wherein the unprocessed hybrid silicone hydrogel contact lens has a water-swelling degree of from about −1% to about 1%.

60. The method of any one of embodiments 1 to 39, or the unprocessed embedded silicone hydrogel contact lens of any one of embodiments 40 to 49, or the unprocessed hybrid silicone hydrogel contact lens of any one of embodiments 50 to 59, wherein at least one poly($C_2$-$C_4$ alkyleneoxide) polymer is represented by formula of $R_1$—O-(EO)$_{m1}$(PO)$_{n1}$(BO)$_{p1}$—$R_2$ in which: $R_1$ and $R_2$ independent of each other is hydrogen or a $C_1$-$C_4$ alkyl (preferably hydrogen or methyl); EO is a divalent radical of ethyleneoxide (—$CH_2$—$CH_2$—O—); PO is a divalent radical of propyleneoxide

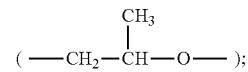

BO is a divalent radical of butyleneoxide

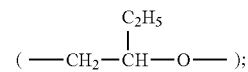

m1 is zero or an integer of from 5 to 65; n1 is zero or an integer of from 5 to 52; p1 is zero or integer of from 5 to 30; wherein if n1 is not zero, p1 is zero; wherein if p1 is not zero, n1 is zero and m1 is not zero; wherein (m1+n1+p1) is a value to provide the poly($C_2$-$C_4$ alkyleneoxide) polymer with a number average molecular weight of from about 300 to about 3000

Daltons (preferably from about 400 to about 2500 Daltons, more preferably from about 400 to about 2000 Daltons, even more preferably from about 400 to about 1500 Daltons)

61. The method of embodiment 60, or the unprocessed embedded or hybrid silicone hydrogel contact lens of embodiment 60, wherein $R_1$ and $R_2$ independent of each other is hydrogen or methyl.

62. The method of embodiment 60 or 61, or the unprocessed embedded or hybrid silicone hydrogel contact lens of embodiment 60 or 661, wherein the poly($C_2$-$C_4$ alkyleneoxide) polymer has a number average molecular weight of from about 400 to about 2500 Daltons.

63. The method of embodiment 60 or 61, or the unprocessed embedded or hybrid silicone hydrogel contact lens of embodiment 60 or 61, wherein the poly($C_2$-$C_4$ alkyleneoxide) polymer has a number average molecular weight of from about 400 to about 2000 Daltons.

64. The method of embodiment 60 or 61, or the unprocessed embedded or hybrid silicone hydrogel contact lens of embodiment 60 or 61, wherein the poly($C_2$-$C_4$ alkyleneoxide) polymer has a number average molecular weight of from about 400 to about 1500 Daltons.

65. The method of any one of embodiments 1 to 39 and 60 to 64, or the unprocessed embedded silicone hydrogel contact lens of any one of embodiments 40 to 49 and 61 to 64, or the unprocessed hybrid silicone hydrogel contact lens of any one of embodiments 50 to 64, wherein at least one poly($C_2$-$C_4$ alkyleneoxide) polymer is poly(ethyleneoxide) ("PEO"), poly(propyleneoxide) ("PPO"), poly(ethyleneoxide)-poly(propyleneoxide) di-block copolymer ("PEO-PPO"), poly(ethyleneoxide)-poly(propyleneoxide)-poly(ethyleneoxide) tri-block copolymer ("PEO-PPO-PEO"), poly(propyleneoxide)-poly(ethyleneoxide)-poly(propyleneoxide) tri-block copolymer ("PPO-PEO-PPO"), poly(ethyleneoxide)-poly(butyleneoxide) di-block copolymer ("PEO-PBO"), poly(ethyleneoxide)-poly(butyleneoxide)-poly(ethyleneoxide) tri-block copolymer ("PEO-PBO-PEO"), poly(butyleneoxide)-poly(ethyleneoxide)-poly(butyleneoxide) tri-block copolymer ("PBO-PEO-PBO"), or a mixture thereof.

66. The method of any one of embodiments 1 to 39 and 60 to 64, or the unprocessed embedded silicone hydrogel contact lens of any one of embodiments 40 to 49 and 60 to 64, or the unprocessed hybrid silicone hydrogel contact lens of any one of embodiments 50 to 64, wherein at least one poly($C_2$-$C_4$ alkyleneoxide) polymer is poly(propyleneoxide) ("PPO").

67. The method of any one of embodiments 1 to 39 and 60 to 64, or the unprocessed embedded silicone hydrogel contact lens of any one of embodiments 40 to 49 and 60 to 64, or the unprocessed hybrid silicone hydrogel contact lens of any one of embodiments 50 to 64, wherein at least one poly($C_2$-$C_4$ alkyleneoxide) polymer is poly(ethyleneoxide)-poly(butyleneoxide) di-block copolymer ("PEO-PBO"), poly(ethyleneoxide)-poly(butyleneoxide)-poly(ethyleneoxide) tri-block copolymer ("PEO-PBO-PEO"), poly(butyleneoxide)-poly(ethyleneoxide)-poly(butyleneoxide) tri-block copolymer ("PBO-PEO-PBO"), or a mixture thereof.

68. The method of any one of embodiments 1 to 39 and 60 to 64, or the unprocessed embedded silicone hydrogel contact lens of any one of embodiments 40 to 49 and 60 to 64, or the unprocessed hybrid silicone hydrogel contact lens of any one of embodiments 50 to 64, wherein at least one poly($C_2$-$C_4$ alkyleneoxide) polymer is poly(ethyleneoxide)-poly(propyleneoxide) di-block copolymer ("PEO-PPO"), poly(ethyleneoxide)-poly(propyleneoxide)-poly(ethyleneoxide) tri-block copolymer ("PEO-PPO-PEO"), poly(propyleneoxide)-poly(ethyleneoxide)-poly(propyleneoxide) tri-block copolymer ("PPO-PEO-PPO"), or a mixture thereof.

69. The method of any one of embodiments 1 to 39 and 60 to 64, or the unprocessed embedded silicone hydrogel contact lens of any one of embodiments 40 to 49 and 60 to 64, or the unprocessed hybrid silicone hydrogel contact lens of any one of embodiments 50 to 64, wherein at least one poly($C_2$-$C_4$ alkyleneoxide) polymer is poly(ethyleneoxide).

70. The method of any one of embodiments 1 to 39 and 60 to 68, or the unprocessed embedded silicone hydrogel contact lens of any one of embodiments 40 to 49 and 60 to 68, or the unprocessed hybrid silicone hydrogel contact lens of any one of embodiments 50 to 68, wherein said at least one silicone-containing vinylic monomer is a vinylic monomer having a bis(trialkylsilyloxy)alkylsilyl group or a tris(trialkylsilyloxy)silyl group, a polysiloxane vinylic monomer, a polycarbosiloxane vinylic monomer, 3-methacryloxy propylpentamethyldisiloxane, t-butyldimethyl-siloxyethyl vinyl carbonate, trimethylsilylethyl vinyl carbonate, trimethylsilylmethyl vinyl carbonate, or combinations thereof, wherein said at least one silicone-containing vinylic monomer is a polysiloxane vinylic crosslinkers, a polycarbosiloxane vinylic crosslinker, or combinations thereof.

71. The method of any one of embodiments 1 to 39 and 60 to 69, or the unprocessed embedded silicone hydrogel contact lens of any one of embodiments 40 to 49 and 60 to 69, or the unprocessed hybrid silicone hydrogel contact lens of any one of embodiments 50 to 69, wherein said at least one hydrophilic vinylic monomer comprises an alkyl (meth)acrylamide, a hydroxyl-containing acrylic monomer, an amino-containing acrylic monomer, a carboxyl-containing acrylic monomer, a N-vinyl amide monomer, a methylene-containing pyrrolidone monomer, an acrylic monomer having a $C_1$-$C_4$ alkoxyethoxy group, a vinyl ether monomer, an allyl ether monomer, a phosphorylcholine-containing vinylic monomer, N-2-hydroxyethyl vinyl carbamate, N-carboxyvinyl-β-alanine (VINAL), N-carboxyvinyl-α-alanine, or combinations thereof.

72. The method of any one of embodiments 1 to 39 and 60 to 69, or the unprocessed embedded silicone hydrogel contact lens of any one of embodiments 40 to 49 and 60 to 69, or the unprocessed hybrid silicone hydrogel contact lens of any one of embodiments 53 to 69, wherein said at least one hydrophilic vinylic monomer comprises (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, or combinations thereof.

73. The method of any one of embodiments 1 to 39 and 60 to 69, or the unprocessed embedded silicone hydrogel contact lens of any one of embodiments 40 to 49 and 60 to 69, or the unprocessed hybrid silicone hydrogel contact lens of any one of embodiments 50 to 69, wherein said at least one hydrophilic vinylic monomer comprises N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, or combinations thereof.

74. The method of any one of embodiments 1 to 39 and 60 to 69, or the unprocessed embedded silicone hydrogel contact lens of any one of embodiments 40 to 49 and 60 to 69, or the unprocessed hybrid silicone hydrogel contact lens of any one of embodiments 50 to 69, wherein said at least one hydrophilic vinylic monomer comprises N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, or combinations thereof (preferably N-vinylpyrrolidone, N-vinyl-N-methyl acetamide, or combinations thereof).

75. The method of any one of embodiments 1 to 39 and 60 to 69, or the unprocessed embedded silicone hydrogel contact lens of any one of embodiments 40 to 49 and 60 to 69, or the unprocessed hybrid silicone hydrogel contact lens of any one of embodiments 50 to 69, wherein said at least one hydrophilic vinylic monomer comprises a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, or combinations thereof.

76. The method of any one of embodiments 1 to 39 and 60 to 75, or the unprocessed embedded silicone hydrogel contact lens of any one of embodiments 40 to 49 and 60 to 75, or the unprocessed hybrid silicone hydrogel contact lens of any one of embodiments 50 to 75, wherein the unprocessed embedded or hybrid silicone hydrogel contact lens comprises repeating units of at least one non-silicone vinylic crosslinker selected from the group consisting of tetra(ethyleneglycol) di-(meth) acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

77. The method of any one of embodiments 1 to 39 and 60 to 76, or the unprocessed embedded silicone hydrogel contact lens of any one of embodiments 40 to 49 and 60 to 76, wherein the insert is a thin RGP disk for providing rigid center optics for masking astigmatism like a RGP contact lens, a multifocal lens insert, a liquid meniscus lens insert, an electro-wetting lens insert, a liquid crystal lens insert, an electro-active lens insert, an electronics insert, an electrode insert, a battery insert, an antennae insert, a circuit insert, a MEM device insert, a sensor insert, an energy receptor insert, a silicone rubber disk having at least one insert embedded therein, a RGP disk having at least one insert embedded therein, or combinations thereof.

78. The method of any one of embodiments 1 to 39 and 60 to 76, or the unprocessed embedded silicone hydrogel contact lens of any one of embodiments 40 to 49 and 60 to 76, wherein the insert has a thickness less than any thickness of the embedded silicone hydrogel contact lens in a region of the unprocessed embedded silicone hydrogel contact lens where the insert is embedded.

79. The method of any one of embodiments 1 to 39 and 60 to 78, or the unprocessed embedded silicone hydrogel contact lens of any one of embodiments 40 to 49 and 60 to 78, wherein the insert is made of a hard plastics, a gas permeable material, a soft plastics, a silicone rubber or elastomer, quartz, glass, a silicate material, a ceramic, a metal, a metal oxide, and a carbon material.

80. The method of any one of embodiments 1 to 39 and 60 to 76, or the unprocessed embedded silicone hydrogel contact lens of any one of embodiments 40 to 49 and 60 to 76, or the unprocessed hybrid silicone hydrogel contact lens of any one of embodiments 50 to 76, wherein the RGP disk comprises at least one insert selected from the group consisting of multifocal lens inserts, liquid meniscus lens inserts, electro-wetting lens inserts, liquid crystal lens inserts, electro-active lens inserts, electronics inserts, electrode inserts, battery inserts, antennae inserts, circuit inserts, MEM device inserts, sensor inserts, energy receptor inserts, and combinations thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a contact lens or contact lens material or an insert or an insert material are determined according to procedures described in ISO 18369-4.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a material or contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Determination of Diameter of Hydrated Contact Lens

Figure 3:
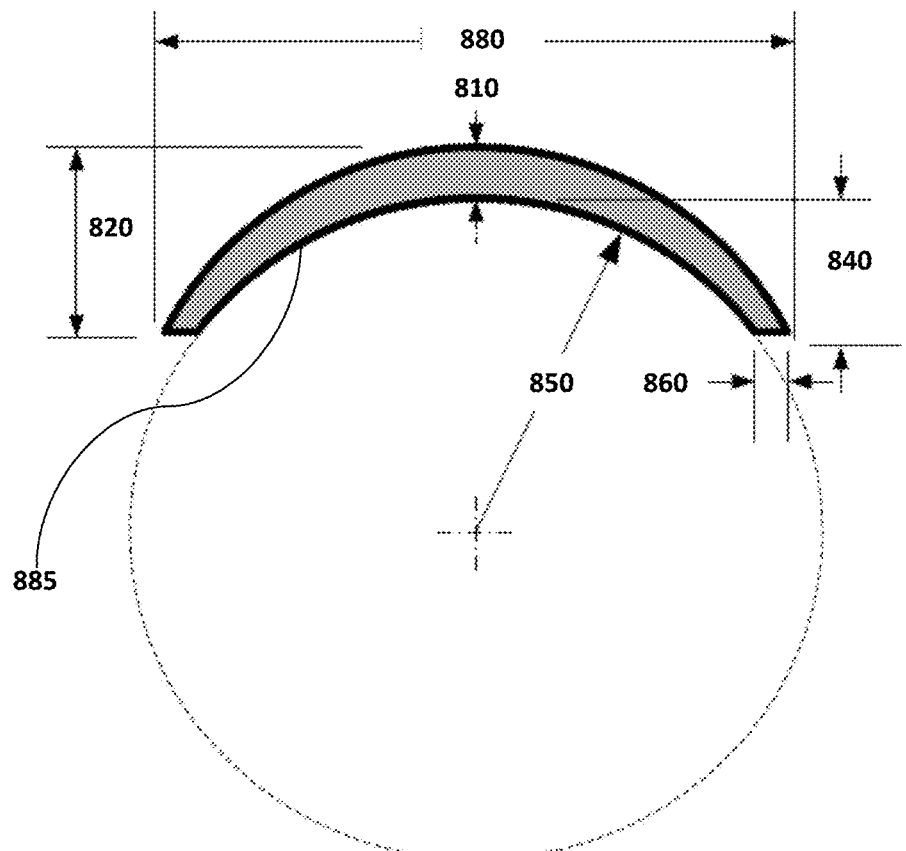
FIG. 3 illustrates the general dimensions of a contact lens.

FIG. 3 shows schematically the general lens dimensions which are typically determined by a contact lens manufacturer. The general dimensions include center thickness (CT) (110), anterior sagittal height (ASag) (120), posterior sagittal height (PSag) (140), base curve equivalent (BCE) (150), edge thickness (ET) (160), and diameter (180) (i.e., chord). Measurements of the general lens dimensions can be carried out on fully hydrated contact lenses in a wetcell by using a low coherence interferometer similar to that described by Heidemana and Greivenkampin in their paper (Optical Engineering 55(3), 034106 (March 2016)).

For measurements, a contact lens is seated on the flat bottom surface of the wetcell which is filled with a phosphate buffered saline and a low coherence interferometer is placed at the geometric center of the lens using a motion controller. The interferometer measures thicknesses of material based off of reflections between different material surfaces. The center of the lens is determined by the measurement by the camera.

The Diameter is defined as the outermost edge of the lens viewed from above the lens. The edge points are fit to an ellipse and the diameter is calculated as the average of the major and minor ellipse diameters. Typically, contact lenses have highly circular diameters and either a circular or elliptical fitting will result in similar values. However, if a lens is slightly out of round, an ellipse more accurately describes the shape of the contact lens diameter than a circle. The lens diameters of 3 to 10 contact lenses from one single batch of contact lenses are measured and averaged to obtain the averaged lens diameter for that batch of contact lenses.

Delamination

Embedded hydrogel contact lenses are examined for possible delamination either using Optimec instrument or Optical Coherence Tomography (OCT).

Regardless of evaluation method, contact lenses are staged for a minimum of 12 hours at room temperature after autoclave run and prior to delamination study.

After meeting required staging time, fully hydrated contact lens is placed in a "V" graticule assembly of Optimec instrument (Model JCF; OPTIMEC England). After the contact lens is settled under the influence of gravity, the front view of the contact lens is inspected carefully for any sign of circular pattern. Delamination displays as circular patterns in Optimec image.

OCT (Spectral Domain Optical Coherence Tomography; Telesto-II; Thorlabs) could also be utilized to study delamination. OCT allows non-invasive imaging of the contact lens to obtain high resolution cross-section image. For this purpose, after meeting the minimum staging requirement, the contact lens is removed from its blister and is soaked into PBS solution for a minimum of 30 min to come to equilibrium. Then a cuvette with a "V" block feature will be filled approximately ¾ with fresh PBS solution and the contact lens will be transferred to the cuvette using Q-tips. The lens will be allowed to freely float to the "V" shape at the bottom of the cuvette and the entire contact lens will be scanned in increment of 10 degree. Delamination appears as air pocket in interval surface of insert and carrier in OCT images.

Example 2

This example illustrates how to control the water-swelling degree of unprocessed SiHy contact lenses by adding a polymeric non-reactive diluent in the polymerizable composition for forming the SiHy materials while ensuring the dry-delensability of unprocessed SiHy contact lenses.

Contact Lens Formulation Composition

A basic polymerizable composition as control lens formulation is prepared at room temperature in air by blending all the components for 30-120 minutes using a magnetic stir plate and has the following composition: 6 weight unit parts of a hydrophilized polydimethylsiloxane vinylic crosslinker of formula (A)

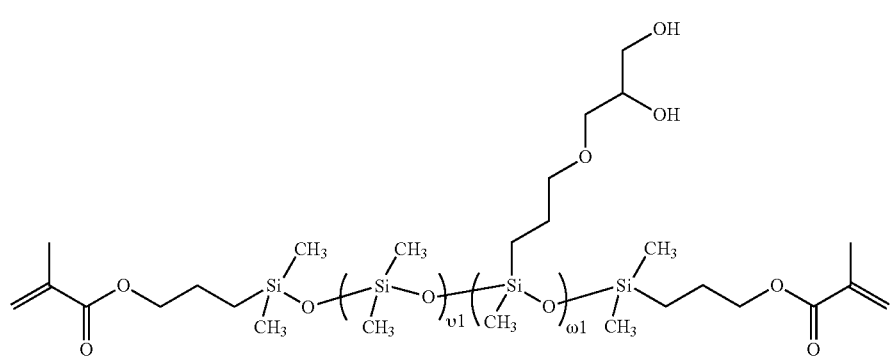

(A)

in which v1 is an integer of from 30 to 500 and ω1 is an integer of from 1 to 75 and is prepared according to procedures described in U.S. patent Ser. No. 10/081,697 (Mn ~10.7K g/mol, OH content ~1.8 meq/g); 34 weight unit parts of monobutyl-terminated monomethacryloxypropyl-terminated polydimethylsiloxane (M.W. 600 to 800 g/mol from Gelest); 40 weight units of N-vinylpyrrolidone; 10.2 weight unit parts of ethylene glycol methyl ether methacrylate; 9 weight unit parts of methyl methacrylate; 0.3 weight unit part of triethyleneglycol dimethacrylate; 0.1 weight unit part of allyl methacrylate; 0.5 weight unit part of Darocur 1173; and 1 weight unit part of tert-amyl alcohol.

Three polymerizable compositions as Formulations I-III are prepared by adding 10, 20, and 30 weight unit parts of tert-amyl alcohol (TAA) respectively into the basic polymerization.

Cast-Molded SiHy Contact Lenses

Cast-molded SiHy contact lenses are prepared by dosing an amount of a formulation prepared above in each polypropylene contact lens molds and then curing using a double-sided UV curing oven having ~12 mW/cm2 intensity (Wicked Engineering, UV LED Module 9W 365 nm/405 nm) for 15 minutes.

Lens molds each with a molded unprocessed SiHy contact lens therein are mechanically opened as illustrated by FIG. 2 and described above. The molded unprocessed SiHy contact lens adhere to the male mold halves and are removed mechanically from the male mold halves (i.e., dry-delensed) only for lenses made from control formulation and formulation I. The diameter ($d_{unprocessed}$) of the dry-delensed unprocessed SiHy contact lenses are determined according to the procedures described in Example 1.

The delensed unprocessed SiHy contact lenses are then extracted and hydrated as follows. First, the unprocessed SiHy contact lenses are extracted with a 50/50 v/v mixture of propylene glycol (PG) and deionized (DI) water twice, each lasting about one hour. The extracted SiHy contact lenses are hydrated in DI water, two times, each lasting about one hour. After hydration, the diameter (i.e., $d_{hydrated}$) of lenses are determined according to the procedures described in Example 1.

The results of tests and dry-delensability observations are reported in Table 1.

TABLE 1

| Formulation # | TAA | Dry-delensability | $d_{unprocessed}$ | $d_{hydrated}$ | WSD |
| --- | --- | --- | --- | --- | --- |
| Control | 0.97 wt % | Yes, without cold air gun | 12.50 | 18.89 mm | 51.5% |

TABLE 1-continued

| Formulation # | TAA | Dry-delensability | $d_{unprocessed}$ | $d_{hydrated}$ | WSD |
| --- | --- | --- | --- | --- | --- |
| I | 9.74 wt % | Yes, without cold air gun | 12.50 | 19.83 mm | 57.4% |
| II | 17.09 wt % | Not dry-delensable | N/A | N/A | N/A |
| III | 23.33 wt % | Not dry-delensable | N/A | N/A | N/A |

Example 3

Contact Lens Formulation Composition

Four polymerizable composition are prepared at room temperature in air by blending all the components for 30-120 minutes using a magnetic stir plate and has the following composition: 33 weight part units of CE-PDMS (Mn 6.5 KD) which has three polydimethylsiloxane (PDMS) segments linked via diurethane linkages between two PDMS segments and two urethane linkages each located between one terminal methacrylate group and one PDMS segment and is prepared according to method similar to what described in Example 2 of U.S. Pat. No. 8,529,057; 17 weight part units of TrisAm (N-[tris(trimethylsiloxy)-silyl-propyl]acrylamide); 24 weight part units of DMA (N,N-dimethylacrylamide); 0.5 weight part unit of Darocur 1173; and 25 weight unit parts of one of the 4 organic solvents (ethylene glycol butyl ether, tert-amyl alcohol, isopropanol, and ethanol).

Cast-molded contact lenses are prepared by dosing an amount of a formulation prepared above in each polypropylene contact lens molds and then curing using a double-sided UV curing oven having~12 mW/cm² intensity (Wicked Engineering, UV LED Module 9W 365 nm/405 nm) for 15 minutes.

Lens molds each with a molded unprocessed SiHy contact lens therein are tried to be mechanically opened as illustrated by FIG. 2 and described above. The molded unprocessed SiHy contact lens are very sticky and fragile. Molded unprocessed SiHy contact lenses are not dry-delensable, i.e., cannot be removed (i.e., "delensed") mechanically even with the aid of a cold air gun directly from lens-adhered male mold halves, as described above.

Example 4

This example illustrates how to control the water-swelling degree of unprocessed SiHy contact lenses by adding a polymeric non-reactive diluent in the polymerizable composition for forming the SiHy materials while ensuring the dry-delensability of unprocessed SiHy contact lenses.

Contact Lens Formulation Composition

A basic polymerizable composition as control lens formulation is prepared at room temperature in air by blending all the components for 30-120 minutes using a magnetic stir plate and has the following composition: 37.44 weight part units of CE-PDMS (Mn 6.5 KD) as described in Example 3; 27.59 weight part units of TrisAm (N-[tris(trimethylsiloxy)-silylpropyl]acrylamide); 33.50 weight part units of DMA (N,N-dimethylacrylamide); 0.49 weight unit parts of pentaerythritol tetraacrylate; and 0.99 weight part unit of Darocur 819.

Four polymerizable compositions as Formulations IV-VII are prepared by adding 15, 20, 25, and 30 weight unit parts of poly(propyleneoxide) (Mn ~425; from Sigma-Aldrich) ("$PPO_{425}$") respectively into the basic polymerization.

Cast-Molded SiHy Contact Lenses

Cast-molded SiHy contact lenses are prepared by dosing an amount of a formulation prepared above in each polypropylene contact lens molds and then curing using a double-sided UV curing oven having ~12 mW/cm² intensity (Wicked Engineering, UV LED Module 9W 365 nm/405 nm) for 15 minutes.

Lens molds each with a molded unprocessed SiHy contact lens therein are mechanically opened as illustrated by FIG. 2 and described above. The molded unprocessed SiHy contact lens adhere to the male mold halves. Molded unprocessed SiHy contact lenses are removed (i.e., "delensed") mechanically with or without the aid of a cold air gun directly from lens-adhered male mold halves, as described above. The diameter ($d_{unprocessed}$) of the dry-delensed unprocessed SiHy contact lenses are determined according to the procedures described in Example 1.

The delensed unprocessed SiHy contact lenses are then extracted and hydrated as follows. First, the unprocessed SiHy contact lenses are extracted with a 50/50 v/v mixture of propylene glycol (PG) and deionized (DI) water twice, each lasting about one hour. The extracted SiHy contact lenses are hydrated in DI water, two times, each lasting about one hour. After hydration, the diameter (i.e., $d_{hydrated}$) of lenses are determined according to the procedures described in Example 1.

The results of tests and dry-delensability observations are reported in Table 2.

TABLE 2

| Formulation # | $PPO_{425}$ | Dry-delensability | $d_{unprocessed}$ | $d_{hydrated}$ | WSD |
|---|---|---|---|---|---|
| Control | 0 | Yes, without cold air gun | 12.50 mm | 13.50 mm | 8.0% |
| IV | 13.0 wt % | Yes, without cold air gun | 12.50 mm | 12.73 mm | 1.8% |
| V | 16.7 wt % | Yes, with cold air gun | 12.50 mm | 12.60 mm | 0.80% |
| VI | 20.0 wt % | Yes, with cold air gun | 12.50 mm | 12.48 mm | −0.16% |
| VII | 25.9 wt % | Yes, with cold air gun | 12.50 mm | 12.40 mm | −0.48% |

Example 5

This example illustrates how to control the water-swelling degree of unprocessed SiHy contact lenses by adding a polymeric non-reactive diluent having a higher molecular weight in the polymerizable composition for forming the SiHy materials while ensuring the dry-delensability of unprocessed SiHy contact lenses.

Contact Lens Formulation Composition

The basic polymerizable composition as control lens formulation is prepared as described in Example 4.

Four polymerizable compositions as Formulations VIII-XI are prepared by adding 15, 20, 25, and 30 weight unit parts of poly(propyleneoxide) (Mn ~1000; from Sigma-Aldrich) ("$PPO_{1000}$") respectively into the basic polymerization.

Cast-Molded SiHy Contact Lenses

The cast-molding of unprocessed SiHy contact lenses, mold separation, delensing, extraction and hydration are carried out as described in Example 4.

The diameters ($d_{unprocessed}$) of the dry-delensed unprocessed SiHy contact lenses and the diameter (i.e., $d_{hydrated}$) of hydrated SiHy contact lenses are determined according to the procedures described in Example 1.

The results of tests and dry-delensability observations are reported in Table 3.

TABLE 3

| Formulation # | $PPO_{1000}$ | Dry-delensability | $d_{unprocessed}$ | $d_{hydrated}$ | WSD |
|---|---|---|---|---|---|
| Control | 0 | Yes, without cold air gun | 12.50 mm | 14.30 mm | 14.4% |
| VIII | 13.0 wt % | Yes, without cold air gun | 12.50 mm | 13.45 mm | 7.6% |
| IX | 16.7 wt % | Yes, with cold air gun | 12.50 mm | 13.00 mm | 4.0% |
| X | 20.0 wt % | Yes, with cold air gun | 12.50 mm | 12.80 mm | 2.4% |
| XI | 25.9 wt % | Yes, with cold air gun | 12.50 mm | 12.73 mm | 1.8% |

Example 6

This example illustrates how to make embedded or hybrid SiHy contact lenses that have no or a minimal lens distortion or delamination after extraction, hydration and autoclave.

SiHy Lens Formulation Composition

A polymerizable composition (SiHy lens formulation) is prepared at room temperature in air by blending all the components for 30-120 minutes using a magnetic stir plate and has the following composition: 32 weight unit parts of a hydrophilized polydimethylsiloxane vinylic crosslinker (Mn ~10.7K g/mol, OH content ~1.8 meq/g) of formula (A) shown in Example 2 above; 24 weight unit parts of N,N-dimethylacrylamide; 21 weight unit parts of tris(trimethylsiloxy)silylpropyl methacrylate; 1.0 weight unit part of Darocur 1173; and 22 weight unit parts of $PPO_{425}$.

Cast-Molded Embedded SiHy Contact Lenses

Figure 4:
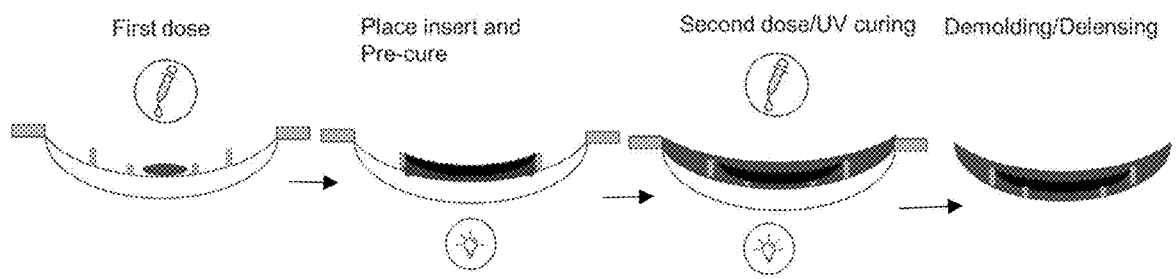
FIG. 4 illustrates a procedure for cast-molding of an embedded SiHy contact lens according to preferred embodiment of the invention.

Cast-molded embedded SiHy contact lenses are prepared according to the procedure illustrated in FIG. 4. A first dose (~3 μL) of the SiHy lens formulation is first added in each of female polypropylene contact lens mold halves, each of which has three long spikes distributed in a circle having a diameter sufficient to accommodate the insert for fixing the position of the insert on the molding surface and three short spikes equally spaced from each other for supporting the insert on the central portion of its molding surface. One Rigid Gas Permeable (RGP) insert is then placed on top of the first-dose of the formulation in each female mold half, which is then subsequently pre-cured for 20 seconds. The second dose of formulation is then added over the RGP insert to fully immerse the RGP insert. Then molds are then closed with male mold halves and fully cured using a double-sided UV curing oven having ~12 mW/cm² intensity (Wicked Engineering, UV LED Module 9W 365 nm/405 nm) for 15 minutes.

Cast-molded embedded SiHy contact lenses are prepared according to the procedure illustrated in FIG. 4. A first dose (~3 μL) of the SiHy lens formulation is first added in each of female polypropylene contact lens mold halves, each of which contains 6 position-guiding posts arranged on the central portion of its molding surface. One Rigid Gas Permeable (RGP) insert is then placed on top of the first-dose of the formulation in each female mold half, which is then subsequently pre-cured for 20 seconds. The second dose of formulation is then added over the RGP insert to fully immerse the RGP insert. Then molds are then closed with male mold halves and fully cured using a double-sided UV curing oven having ~12 mW/cm² intensity (Wicked Engineering, UV LED Module 9W 365 nm/405 nm) for 15 minutes.

Lens molds each with a molded unprocessed embedded SiHy contact lens therein are mechanically opened as illustrated by FIG. 2 and described above. The molded unprocessed embedded SiHy contact lens adhere to the male mold halves. Molded unprocessed embedded SiHy contact lenses are removed (i.e., "delensed") mechanically with or without the aid of a cold air gun directly from lens-adhered male mold halves, as described above. The unprocessed embedded SiHy contact lenses are extracted with deionized (DI) water, first in a first DI water bath at 50° C. for two hours and then in a second DI water bath at 50° C. for one hour. The extracted embedded SiHy contact lenses are immersed (dip-coated) in an aqueous solution (0.1% by weight pH ~2.5) of polyacrylic acid (PAA, Mn ~450 KD) at room temperature for two hours. The PAA-coated embedded SiHy contact lenses are immersed in a phosphate-buffered salien (PBS) (pH ~7.2±0.2 at 25° C., about 0.044 wt. % NaH₂PO₄·H₂O, about 0.388 wt. % Na₂HPO₄.2H₂O, and about 0.79 wt. % NaCl) at room temperature for one hour. After rinsing in PBS, the coated embedded SiHy contact lenses are placed in polypropylene lens packaging shells (or blisters) (one lens per shell) with 0.6 mL of PBS. The blisters are then sealed with foil and autoclaved for about 45 minutes at about 121° C.

Figure 5:
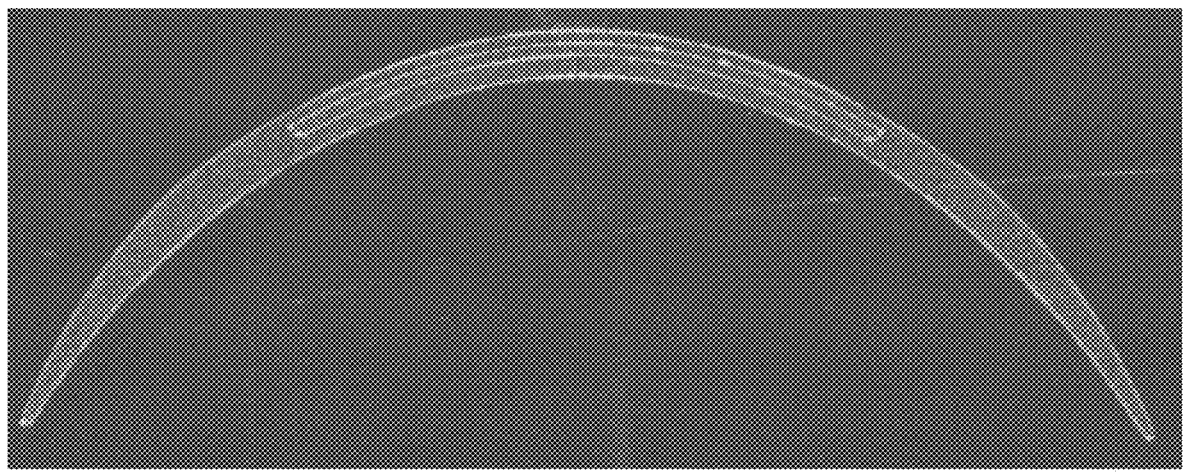
FIG. 5 shows an OCT image of an embedded hydrogel contact lens produced according to a method of the invention.

The resultant embedded SiHy contact lenses are examined for possible delamination using OCT according to the procedures described in Example 1. No delamination is observed. The embedded SiHy contact lenses show having well-defined lens geometry after delensing, extraction, coating, hydration and autoclave (see, FIG. 5). Both the insert and the bulk material have minimum swell ratio upon hydration, resulting in minimum internal stress and thus good geometry stability over time.

Cast-Molded SiHy Contact Lenses

Cast-molded SiHy contact lenses are prepared by dosing an amount of the SiHy lens formulation prepared above in each polypropylene contact lens molds and then curing using a double-sided UV curing oven having ~12 mW/cm² intensity (Wicked Engineering, UV LED Module 9W 365 nm/405 nm) for 15 minutes.

The cast-molded SiHy contact lenses are demolded, delensed, extracted with DI water, dip-coated in an aqueous PAA solution (0.1% by weight pH ~2.5), hydrated/rinsed in PBS, and packaged/autoclaved according to the procedures described above for the embedded SiHy contact lenses. The les properties of the resultant SiHy contact lenses are determined according to the procedures described in Example 1 and reported in Table 4.

TABLE 4

| Lens Properties | |
|---|---|
| Dk (Barrers) | 152 ± 3 |
| Equilibrium Water Content (by weight) | 31.0% |
| Elastic Modulus (MPa) | 0.52 |

All the publications, patents, and patent application publications, which have been cited herein above in this application, are hereby incorporated by reference in their entireties.

What is claimed is:

1. A method for producing embedded silicone hydrogel contact lenses, wherein each of the embedded silicone hydrogel contact lenses has at least one insert embedded therein, comprising the steps of:

(1) obtaining a polymerizable composition for forming a silicone hydrogel material, wherein the polymerizable composition comprising from about 1% to about 25% by weight of at least one polymeric non-reactive diluent relative to the total weight of the polymerizable composition and polymerizable materials dissolved in or blended with the polymeric diluent, wherein the polymerizable materials comprise (a) at least one silicone-containing vinylic monomer and/or at least one silicone-containing vinylic crosslinker and (b) at least one hydrophilic vinylic monomer, wherein said at least one polymeric non-reactive diluent comprises a poly($C_2$-$C_4$ alkyleneoxide) polymer;

(2) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;

(3) obtaining an insert or a disk, wherein the insert is made of a non-hydrogel material;

(4) in no particular order, placing the insert at a specified position in the lens mold and introducing the polymerizable composition in the lens mold, wherein the insert is immersed in the polymerizable composition in the lens mold;

(5) curing the polymerizable composition in the lens mold to form an unprocessed embedded silicone hydrogel contact lens, wherein the unprocessed embedded silicone hydrogel contact lens has the insert surrounded by the silicone hydrogel material;

(6) separating the lens mold obtained in step (5) into the male and female mold halves, with the unprocessed embedded silicone hydrogel contact lens adhered on a lens-adhered mold half which is one of the male and female mold halves;

(7) removing the unprocessed embedded silicone hydrogel contact lens from the lens-adhered mold half; and (8) subjecting the unprocessed embedded silicone hydrogel contact lens to post-molding processes including a hydration process and one or more other processes selected from the group consisting of extraction, surface treatment, packaging, sterilization, and combinations thereof to obtain the embedded silicone hydrogel contact lenses.

2. The method of claim 1, wherein the unprocessed embedded silicone hydrogel contact lens is mechanically removed from the lens-adhered mold half.

3. The method of claim 2, wherein the step of removing the unprocessed embedded silicone hydrogel contact lens from the lens-adhered mold half is aided by blowing cold air over the unprocessed embedded silicone hydrogel contact lens and/or the lens-adhered mold half.

4. The method of claim 1, wherein the step of curing the polymerizable composition in the lens mold is carried out actinically by irradiating the polymerizable composition in the mold with a UV light or visible light.

5. The method of claim 1, wherein the step of curing the polymerizable composition in the lens mold is carried out thermally in an oven at a temperature of from 25° C. to 120° C. for from about 1 to 24 hours.

6. The method of claim 5, wherein the step of curing is carried out under an inert atmosphere.

7. The method of claim 1, wherein the amount of the polymeric non-reactive diluent in the polymerizable composition is sufficient for providing the unprocessed embedded silicone hydrogel contact lens with a water-swelling degree of from about −7% to about 7%.

8. The method of claim 7, wherein the polymerizable composition comprises less than 10% by weight of any non-reactive diluent other than the polymeric non-reactive diluent.

9. The method of claim 8, wherein the polymerizable composition comprises: (i) from about 20% to about 79% by weight of said at least one silicone-containing vinylic monomer and/or said at least one silicone-containing vinylic crosslinker relative to the total weight of the polymerizable composition; (ii) from 20% to about 79% by weight of the hydrophilic vinylic monomer relative to the total weight of the polymerizable composition; (iii) from 0 to about 2.5 by weight of at least one non-silicone vinylic crosslinker relative to the total weight of the polymerizable composition; (iv) from 0 to about 15% by weight of at least one blending vinylic monomer relative to the total weight of the polymerizable composition; or (vi) combinations thereof.

10. The method of claim 9, wherein the sum of the amounts of polymerizable materials (a) and (b) is at least 70% by weight relative to the total amount of all polymerizable materials in the polymerizable composition.

11. The method of claim 10, wherein at least one poly($C_2$-$C_4$ alkyleneoxide) polymer is represented by formula of $R_1$—O-(EO)$_{m1}$(PO)$_{n1}$(BO)$_{p1}$—$R_2$ in which: $R_1$ and $R_2$ independent of each other is hydrogen or a $C_1$-$C_4$ alkyl; EO is a divalent radical of ethyleneoxide (—CH$_2$—CH$_2$—O—); PO is a divalent radical of propyleneoxide

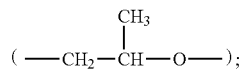

BO is a divalent radical of butyleneoxide

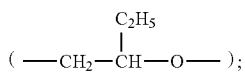

m1 is zero or an integer of from 5 to 65; n1 is zero or an integer of from 5 to 52; p1 is zero or integer of from 5 to 30; wherein if n1 is not zero, p1 is zero; wherein if p1 is not zero, n1 is zero and m1 is not zero; wherein (m1+n1+p1) is a value to provide the poly($C_2$-$C_4$ alkyleneoxide) polymer with a number average molecular weight of from about 300 to about 3000 Daltons.

12. The method of claim 11, wherein at least one poly ($C_2$-$C_4$ alkyleneoxide) polymer is poly(ethyleneoxide) ("PEO"), poly(propyleneoxide) ("PPO"), poly(ethyleneoxide)-poly(propyleneoxide) di-block copolymer ("PEO-PPO"), poly(ethyleneoxide)-poly(propyleneoxide)-poly(ethyleneoxide) tri-block copolymer ("PEO-PPO-PEO"), poly(propyleneoxide)-poly(ethyleneoxide)-poly(propyleneoxide) tri-block copolymer ("PPO-PEO-PPO"), poly(ethyleneoxide)-poly(butyleneoxide) di-block copolymer ("PEO-PBO"), poly(ethyleneoxide)-poly(butyleneoxide)-poly(ethyleneoxide) tri-block copolymer ("PEO-PBO-PEO"), poly(butyleneoxide)-poly(ethyleneoxide)-poly(butyleneoxide) tri-block copolymer ("PBO-PEO-PBO"), or a mixture thereof.

13. The method of claim 11, wherein at least one poly ($C_2$-$C_4$ alkyleneoxide) polymer is poly(propyleneoxide) ("PPO").

14. The method of claim 11, wherein said at least one silicone-containing vinylic monomer is a vinylic monomer having a bis(trialkylsilyloxy)alkylsilyl group or a tris(trialkylsilyloxy)silyl group, a polysiloxane vinylic monomer, a polycarbosiloxane vinylic monomer, 3-methacryloxy propylpentamethyldisiloxane, t-butyldimethyl-siloxyethyl vinyl carbonate, trimethylsilylethyl vinyl carbonate, trimethylsilylmethyl vinyl carbonate, or combinations thereof, wherein said at least one silicone-containing vinylic monomer is a polysiloxane vinylic crosslinkers, a polycarbosiloxane vinylic crosslinker, or combinations thereof; wherein said at least one hydrophilic vinylic monomer comprises an alkyl (meth)acrylamide, a hydroxyl-containing acrylic monomer, an amino-containing acrylic monomer, a carboxyl-containing acrylic monomer, a N-vinyl amide monomer, a methylene-containing pyrrolidone monomer, an acrylic monomer having a $C_1$-$C_4$ alkoxyethoxy group, a vinyl ether monomer, an allyl ether monomer, a phosphorylcholine-containing vinylic monomer, N-2-hydroxyethyl vinyl carbamate, N-carboxyvinyl-β-alanine (VINAL), N-carboxyvinyl-α-alanine, or combinations thereof.

15. The method of claim 14, wherein the unprocessed embedded silicone hydrogel contact lens comprises repeating units of at least one non-silicone vinylic crosslinker selected from the group consisting of tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

16. The method of claim 15, wherein the insert is a thin RGP disk for providing rigid center optics for masking astigmatism, a multifocal lens insert, a liquid meniscus lens insert, an electro-wetting lens insert, a liquid crystal lens insert, an electro-active lens insert, an electronics insert, an electrode insert, a battery insert, an antennae insert, a circuit insert, a MEM device insert, a sensor insert, an energy receptor insert, a silicone rubber disk having at least one insert embedded therein, a RGP disk having at least one insert embedded therein, or combinations thereof.

17. The method of claim 16, wherein the insert has a thickness less than any thickness of the embedded silicone hydrogel contact lens in a region of the unprocessed embedded silicone hydrogel contact lens where the insert is embedded.

18. The method of claim 16, wherein the insert is made of a hard plastics, a gas permeable material, a soft plastics, a silicone rubber or elastomer, quartz, glass, a silicate material, a ceramic, a metal, a metal oxide, and a carbon material.

19. The method of claim 16, wherein the insert is a thin RGP disk for providing rigid center optics for masking astigmatism, wherein the RGP disk comprises at least one insert selected from the group consisting of multifocal lens inserts, liquid meniscus lens inserts, electro-wetting lens inserts, liquid crystal lens inserts, electro-active lens inserts, electronics inserts, electrode inserts, battery inserts, antennae inserts, circuit inserts, MEM device inserts, sensor inserts, energy receptor inserts, and combinations thereof.

20. An unprocessed embedded silicone hydrogel contact lens, wherein the unprocessed embedded silicone hydrogel contact lens is obtained by cast-molding of a polymerizable composition in a lens mold and has not been subjected to extraction and/or hydration post-molding processes, comprising:
a silicone hydrogel material; at least one insert; and from about 0.5% to about 24% by weight of at least one polymeric non-reactive diluent relative to the total weight of the unprocessed embedded silicone hydrogel contact lens,
wherein the silicone hydrogel material is a crosslinked material that has a polymer matrix and comprises (a) repeating units of at least one silicone-containing vinylic monomer and/or at least one silicone-containing vinylic crosslinker and (b) repeating units of at least one hydrophilic vinylic monomer, wherein the insert is made of a non-hydrogel material and is surrounded by the silicone hydrogel material, wherein said at least one polymeric non-reactive diluent is distributed within the polymer matrix of the silicone hydrogel material and comprises a poly($C_2$-$C_4$ alkyleneoxide) polymer, wherein the unprocessed embedded silicone hydrogel contact lens is capable of absorbing from about 15% to about 70% by weight of water when being fully hydrated, wherein the unprocessed embedded silicone hydrogel contact lens has a water-swelling degree of from about −7% to about 7%.

21. The unprocessed embedded silicone hydrogel contact lens of claim 20, wherein the unprocessed embedded or hybrid silicone hydrogel contact lens is capable of absorbing from about 15% to about 60% by weight of water when being fully hydrated.

22. The unprocessed embedded silicone hydrogel contact lens of claim 21, wherein at least one poly($C_2$-$C_4$ alkyleneoxide) polymer is represented by formula of $R_1$—O—(EO)$_{m1}$(PO)$_{n1}$(BO)$_{p1}$—$R_2$ in which: $R_1$ and $R_2$ independent of each other is hydrogen or a $C_1$-$C_4$ alkyl; EO is a divalent radical of ethyleneoxide (—$CH_2$—$CH_2$—O—); PO is a divalent radical of propyleneoxide

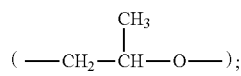

BO is a divalent radical of butyleneoxide

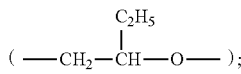

m1 is zero or an integer of from 5 to 65; n1 is zero or an integer of from 5 to 52; p1 is zero or integer of from 5 to 30; wherein if n1 is not zero, p1 is zero; wherein if p1 is not zero, n1 is zero and m1 is not zero; wherein (m1+n1+p1) is a value to provide the poly($C_2$-$C_4$ alkyleneoxide) polymer with a number average molecular weight of from about 300 to about 3000 Daltons.

23. The unprocessed embedded silicone hydrogel contact lens of claim 22, wherein said at least one silicone-containing vinylic monomer is a vinylic monomer having a bis(trialkylsilyloxy)alkylsilyl group or a tris(trialkylsilyloxy)silyl group, a polysiloxane vinylic monomer, a polycarbosiloxane vinylic monomer, 3-methacryloxy propylpentamethyldisiloxane, t-butyldimethyl-siloxyethyl vinyl carbonate, trimethylsilylethyl vinyl carbonate, trimethylsilylmethyl vinyl carbonate, or combinations thereof, wherein said at least one silicone-containing vinylic monomer is a polysiloxane vinylic crosslinkers, a polycarbosiloxane vinylic crosslinker, or combinations thereof; wherein said at least one hydrophilic vinylic monomer comprises an alkyl (meth)acrylamide, a hydroxyl-containing acrylic monomer, an amino-containing acrylic monomer, a carboxyl-containing acrylic monomer, a N-vinyl amide monomer, a methylene-containing pyrrolidone monomer, an acrylic monomer having a $C_1$-$C_4$ alkoxyethoxy group, a vinyl ether monomer, an allyl ether monomer, a phosphorylcholine-containing vinylic monomer, N-2-hydroxyethyl vinyl carbamate, N-carboxyvinyl-β-alanine (VINAL), N-carboxyvinyl-α-alanine, or combinations thereof; wherein the unprocessed embedded or hybrid silicone hydrogel contact lens comprises repeating units of at least one non-silicone vinylic crosslinker selected from the group consisting of tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

24. The unprocessed embedded silicone hydrogel contact lens of claim 23, wherein the insert is a thin RGP disk for providing rigid center optics for masking astigmatism, a multifocal lens insert, a liquid meniscus lens insert, an electro-wetting lens insert, a liquid crystal lens insert, an electro-active lens insert, an electronics insert, an electrode insert, a battery insert, an antennae insert, a circuit insert, a MEM device insert, a sensor insert, an energy receptor insert, a silicone rubber disk having at least one insert embedded therein, a RGP disk having at least one insert embedded therein, or combinations thereof, wherein the insert has a thickness less than any thickness of the embedded silicone hydrogel contact lens in a region of the unprocessed embedded silicone hydrogel contact lens where the insert is embedded.

25. The unprocessed embedded silicone hydrogel contact lens of claim 24, wherein the insert is made of a hard plastics, a gas permeable material, a soft plastics, a silicone rubber or elastomer, quartz, glass, a silicate material, a ceramic, a metal, a metal oxide, and a carbon material.

26. The unprocessed embedded silicone hydrogel contact lens of claim 24, wherein the insert is a thin RGP disk for providing rigid center optics for masking astigmatism, wherein the RGP disk comprises at least one insert selected from the group consisting of multifocal lens inserts, liquid meniscus lens inserts, electro-wetting lens inserts, liquid crystal lens inserts, electro-active lens inserts, electronics inserts, electrode inserts, battery inserts, antennae inserts, circuit inserts, MEM device inserts, sensor inserts, energy receptor inserts, and combinations thereof.

27. An unprocessed hybrid silicone hydrogel contact lens, wherein the unprocessed hybrid silicone hydrogel contact lens is obtained by cast-molding of a polymerizable composition in a lens mold and has not been subjected to extraction and/or hydration post-molding processes, consisting essentially of two zones:
a central optical zone that is made of a rigid gas permeable material; and a peripheral zone that is made of a silicone hydrogel material and surrounds the central optical zone, wherein the unprocessed hybrid silicone hydrogel contact lens comprises from about 0.25% to about 20% by weight of at least one polymeric non-reactive diluent relative to the total weight of the unprocessed hybrid silicone hydrogel contact lens, wherein the silicone hydrogel material is a crosslinked material that has a polymer matrix and comprises (a) repeating units of at least one silicone-containing vinylic monomer and/or at least one silicone-containing vinylic crosslinker and (b) repeating units of at least one hydrophilic vinylic monomer, wherein said at least one polymeric non-reactive diluent is distributed within the polymer matrix of the silicone hydrogel material and comprises a poly($C_2$-$C_4$ alkyleneoxide) polymer, wherein the unprocessed hybrid silicone hydrogel contact lens is capable of absorbing from about 10% to about 60% by weight of water when being fully hydrated, wherein the unprocessed hybrid silicone hydrogel contact lens has a water-swelling degree of from about −7% to about 7%.

28. The unprocessed hybrid silicone hydrogel contact lens of claim 27, wherein the unprocessed hybrid silicone hydrogel contact lens is capable of absorbing from about 15% to about 60% by weight of water when being fully hydrated.

29. The unprocessed hybrid silicone hydrogel contact lens of claim 28, wherein at least one poly($C_2$-$C_4$ alkyleneoxide) polymer is represented by formula of $R_1$—O-$(EO)_{m1}$ $(PO)_{n1}(BO)_{p1}$—$R_2$ in which: $R_1$ and $R_2$ independent of each other is hydrogen or a $C_1$-$C_4$ alkyl; EO is a divalent radical of ethyleneoxide (—$CH_2$—$CH_2$—O—); PO is a divalent radical of propyleneoxide

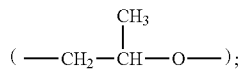

BO is a divalent radical of butyleneoxide

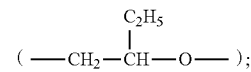

m1 is zero or an integer of from 5 to 65; n1 is zero or an integer of from 5 to 52; p1 is zero or integer of from 5 to 30; wherein if n1 is not zero, p1 is zero; wherein if p1 is not zero, n1 is zero and m1 is not zero; wherein (m1+n1+p1) is a value to provide the poly($C_2$-$C_4$ alkyleneoxide) polymer with a number average molecular weight of from about 300 to about 3000 Daltons.

30. The unprocessed hybrid silicone hydrogel contact lens of claim 29, wherein said at least one silicone-containing vinylic monomer is a vinylic monomer having a bis(trialkylsilyloxy)alkylsilyl group or a tris(trialkylsilyloxy)silyl group, a polysiloxane vinylic monomer, a polycarbosiloxane vinylic monomer, 3-methacryloxy propylpentamethyldisiloxane, t-butyldimethyl-siloxyethyl vinyl carbonate, trimethylsilylethyl vinyl carbonate, trimethylsilylmethyl vinyl carbonate, or combinations thereof, wherein said at least one silicone-containing vinylic monomer is a polysiloxane vinylic crosslinkers, a polycarbosiloxane vinylic crosslinker, or combinations thereof; wherein said at least one hydrophilic vinylic monomer comprises an alkyl (meth)acrylamide, a hydroxyl-containing acrylic monomer, an amino-containing acrylic monomer, a carboxyl-containing acrylic monomer, a N-vinyl amide monomer, a methylene-containing pyrrolidone monomer, an acrylic monomer having a $C_1$-$C_4$ alkoxyethoxy group, a vinyl ether monomer, an allyl ether monomer, a phosphorylcholine-containing vinylic monomer, N-2-hydroxyethyl vinyl carbamate, N-carboxyvinyl-β-alanine (VINAL), N-carboxyvinyl-α-alanine, or combinations thereof; wherein the unprocessed embedded or hybrid silicone hydrogel contact lens comprises repeating units of at least one non-silicone vinylic crosslinker selected from the group consisting of tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

* * * * *